US012287256B2

(12) United States Patent
Fayfield et al.

(10) Patent No.: US 12,287,256 B2
(45) Date of Patent: *Apr. 29, 2025

(54) VIBRATIONAL ALARMS FACILITATED BY DETERMINATION OF MOTOR ON-OFF STATE IN VARIABLE-DUTY MULTI-MOTOR MACHINES

(71) Applicant: Banner Engineering Corp., Minneapolis, MN (US)

(72) Inventors: Robert T. Fayfield, Orono, MN (US); Ryan Kornetzke, Plymouth, MN (US)

(73) Assignee: Banner Engineering Corp., Minneapolis, MN (US)

( * ) Notice: Subject to any disclaimer, the term of this patent is extended or adjusted under 35 U.S.C. 154(b) by 243 days.

This patent is subject to a terminal disclaimer.

(21) Appl. No.: 18/146,315

(22) Filed: Dec. 23, 2022

(65) Prior Publication Data

US 2023/0132266 A1    Apr. 27, 2023

Related U.S. Application Data

(63) Continuation of application No. 17/301,632, filed on Apr. 9, 2021, now Pat. No. 11,585,726, which is a (Continued)

(51) Int. Cl.
*G01M 13/045*    (2019.01)
*G01H 1/00*    (2006.01)
*G05B 23/02*    (2006.01)

(52) U.S. Cl.
CPC .......... *G01M 13/045* (2013.01); *G01H 1/003* (2013.01); *G05B 23/027* (2013.01); (Continued)

(58) Field of Classification Search
CPC .... G01M 13/045; G01M 15/12; G01H 1/003; G05B 23/027; G05B 23/0283; G05B 23/0289; G05B 23/0264
See application file for complete search history.

(56) References Cited

U.S. PATENT DOCUMENTS 5,922,963 A    7/1999  Piety et al.
6,507,790 B1 *  1/2003  Radomski .............. G01H 1/003
                                                        702/42
(Continued)

OTHER PUBLICATIONS

Tractian, Vibration Analysis and Proactive Maintenance for your critical assets, accessed Aug. 1, 2023, https://tractian.com/en/product/vibration-sensor/vibration-analysis.

*Primary Examiner* — Kristina M Deherrera
*Assistant Examiner* — Gedeon M Kidanu
(74) *Attorney, Agent, or Firm* — Thompson Patent Law Offices PC

(57) ABSTRACT

Apparatus and associated methods relate to a vibrational sensing system (VSS) including an accelerometer and a data processor, which determines an "operational state" of a mechanical drive unit, the processor further employing the "operational state" to gate learning of long-term vibrational data to exclude collection of non-operational data, the long-term data collected to calculate alarm thresholds. For example, vibrations from a target motor are sensed by a coupled accelerometer. Vibrational data from the accelerometer is fed into a data processor which determines the operational state of the motor. The operational state (e.g., on/off indication) may gate data collection such that data is only acquired during on-time, which may advantageously create accurate baselines from which alarm thresholds may be generated, and nuisance alarms may be avoided.

28 Claims, 14 Drawing Sheets

Related U.S. Application Data continuation of application No. 16/109,441, filed on Aug. 22, 2018, now Pat. No. 11,002,634.

(60) Provisional application No. 62/549,581, filed on Aug. 24, 2017.

(52) U.S. Cl.
CPC ..... *G05B 23/0283* (2013.01); *G05B 23/0289* (2013.01); *G05B 23/0264* (2013.01)

(56) References Cited

U.S. PATENT DOCUMENTS

| | | |
|---|---|---|
| 7,424,403 B2 | 9/2008 | Robinson et al. |
| 8,049,637 B2 | 11/2011 | Tompkins et al. |
| 8,154,417 B2 | 4/2012 | Hauenstein et al. |
| 8,473,252 B2 | 6/2013 | Kar et al. |
| 8,618,934 B2 | 12/2013 | Belov et al. |
| 2016/0346891 A1 | 12/2016 | Ando |
| 2017/0363072 A1 | 12/2017 | Son et al. |
| 2019/0049413 A1* | 2/2019 | Aoki ..................... G01N 29/14 |
| 2019/0139377 A1* | 5/2019 | Fayfield ................. G08B 5/36 |

* cited by examiner

VIBRATIONAL ALARMS FACILITATED BY DETERMINATION OF MOTOR ON-OFF STATE IN VARIABLE-DUTY MULTI-MOTOR MACHINES

CROSS-REFERENCE TO RELATED APPLICATIONS

This application is a continuation of, and claims the benefit of, U.S. application Ser. No. 17/301,632, titled "Vibrational Alarms Facilitated by Determination of Motor On-Off State in Variable-Duty Multi-Motor Machines," filed by Robert T. Fayfield, et al., on Apr. 9, 2021 which is a continuation of, and claims the benefit of, U.S. application Ser. No. 16/109,441, titled "Vibrational Alarms Facilitated by Determination of Motor On-Off State in Variable-Duty Multi-Motor Machines," filed by Robert T. Fayfield, et al., on Aug. 22, 2018, which claims the benefit of U.S. Provisional Application Ser. No. 62/549,581 titled "Vibrational Alarms Facilitated by Determination of Motor On-Off State in Variable-Duty Multi-Motor Machines," filed by Fayfield, et al. on Aug. 24, 2017.

This application incorporates the entire contents of the foregoing application(s) herein by reference.

TECHNICAL FIELD

Various embodiments relate generally to vibration monitoring and vibration analytics.

BACKGROUND

Various mechanical drive units are employed in industry for a variety of reasons. For example, conventional rotary motors may be employed to move products through manufacturing, to move air, to perform various machining such as cutting, drilling, grinding, and to drive various processes such as stirring, lifting and pumping. In some examples, linear motors may be employed to move various cams and shafts, or to perform various machining such as sanding and shaving. Mechanical drive units such as motors and various vibrating machines may perform a variety of other useful tasks. In some examples, electronic control units may control the operational state of machines containing mechanical drive units.

Motors and other machines may produce vibrational motion as a side effect of their operation. Vibrations may be caused by slight imperfections in the components making up the machine or motors. For example, various bearings within rotating motors may contain imperfections or may wear over time. These imperfections may also lead to various vibrational behavior. In some examples, the vibrations may be at the rotational frequency of the motor(s).

Some machines may contain multiple motors running simultaneously or running intermittent duty (cycling on/off). The on/off cycling of motors within a machine may be uncorrelated. In some industries, motors employed on the factory floor(s) may run uninterrupted for hours, and some may be idle for hours. Some motors may be located in remote, difficult-to-access areas.

SUMMARY

Apparatus and associated methods relate to a vibrational sensing system (VSS) including an accelerometer and a data processor, which determines an "operational state" of a mechanical drive unit, the processor further employing the "operational state" to gate learning of long-term vibrational data to exclude collection of non-operational data, the long-term data collected to calculate alarm thresholds. For example, vibrations from a target motor are sensed by a coupled accelerometer. Vibrational data from the accelerometer is fed into a data processor which determines the operational state of the motor. The operational state (e.g., on/off indication) may gate data collection such that data is only acquired during on-time, which may advantageously create accurate baselines from which alarm thresholds may be generated, and nuisance alarms may be avoided.

Various embodiments may achieve one or more advantages. For example, some embodiments may autonomously determine the on-off state of a motor within a machine that contains one or more sources of vibration, thereby reliably implementing disturbance rejection of cross-coupled machines. Using this method, some embodiments may produce long-term vibrational analytics for motors under intermittent operation, by logging data during on-state (run-time) only, avoiding false alarms. In an illustrative example, the VSS may autonomously indicate a motor's running state based on vibration in a machine that contains multiple sources of vibration. The VSS may learn long-term trends of motor vibrations, thereby determining appropriate alarm thresholds, which may be employed to provide a kind of "check engine light" for each motor. The alarms may avoid unexpected downtime of motors by recognizing long term wear conditions and/or failure trends (e.g., imbalance, misalignment, looseness, bearing degradation) early on, giving time to schedule preventative maintenance and extended machine life.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 3A:
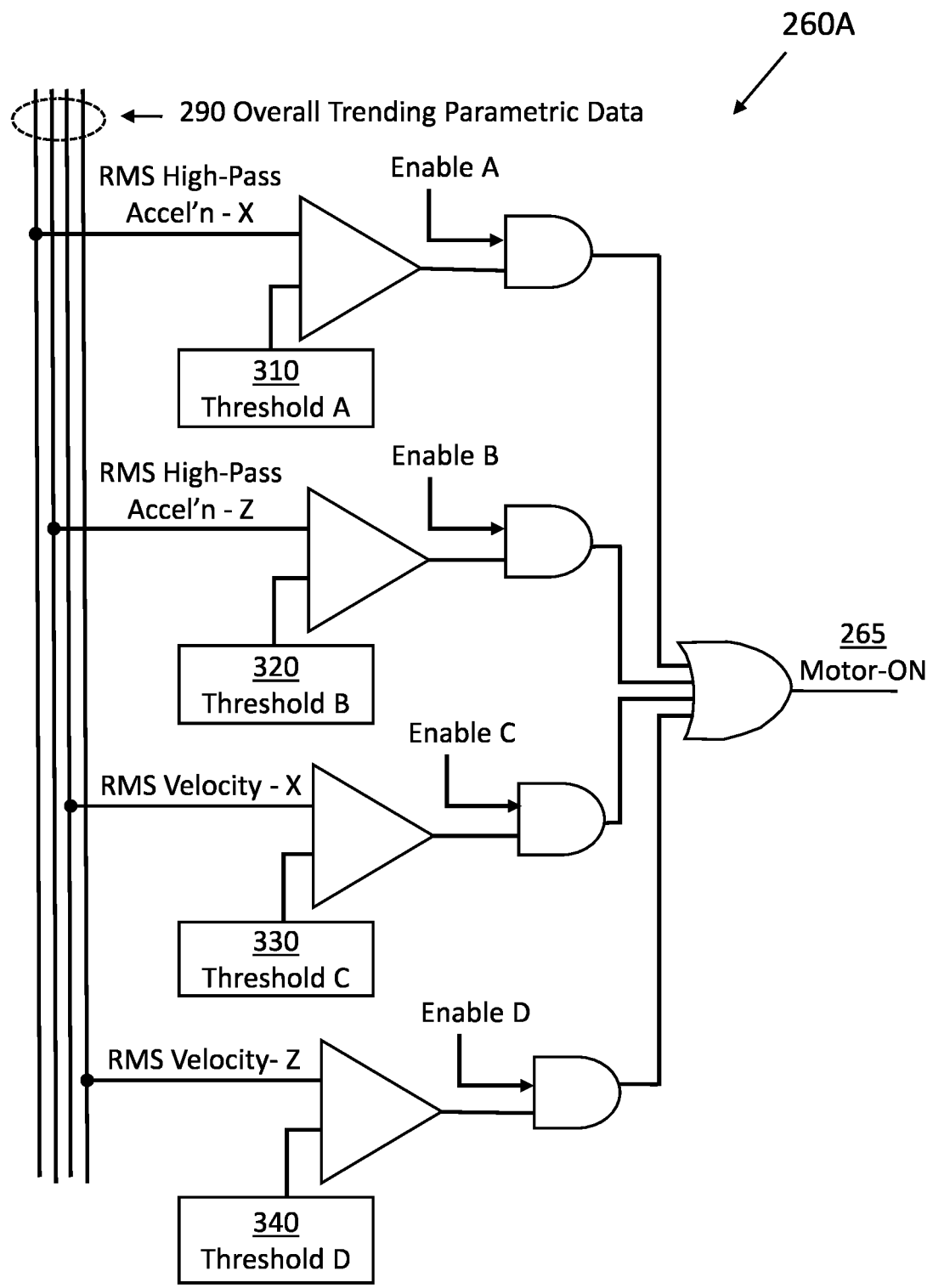
FIGS. 3A and 3B depict schematic views of exemplary motor on-off determination circuits.
Figure 3B:
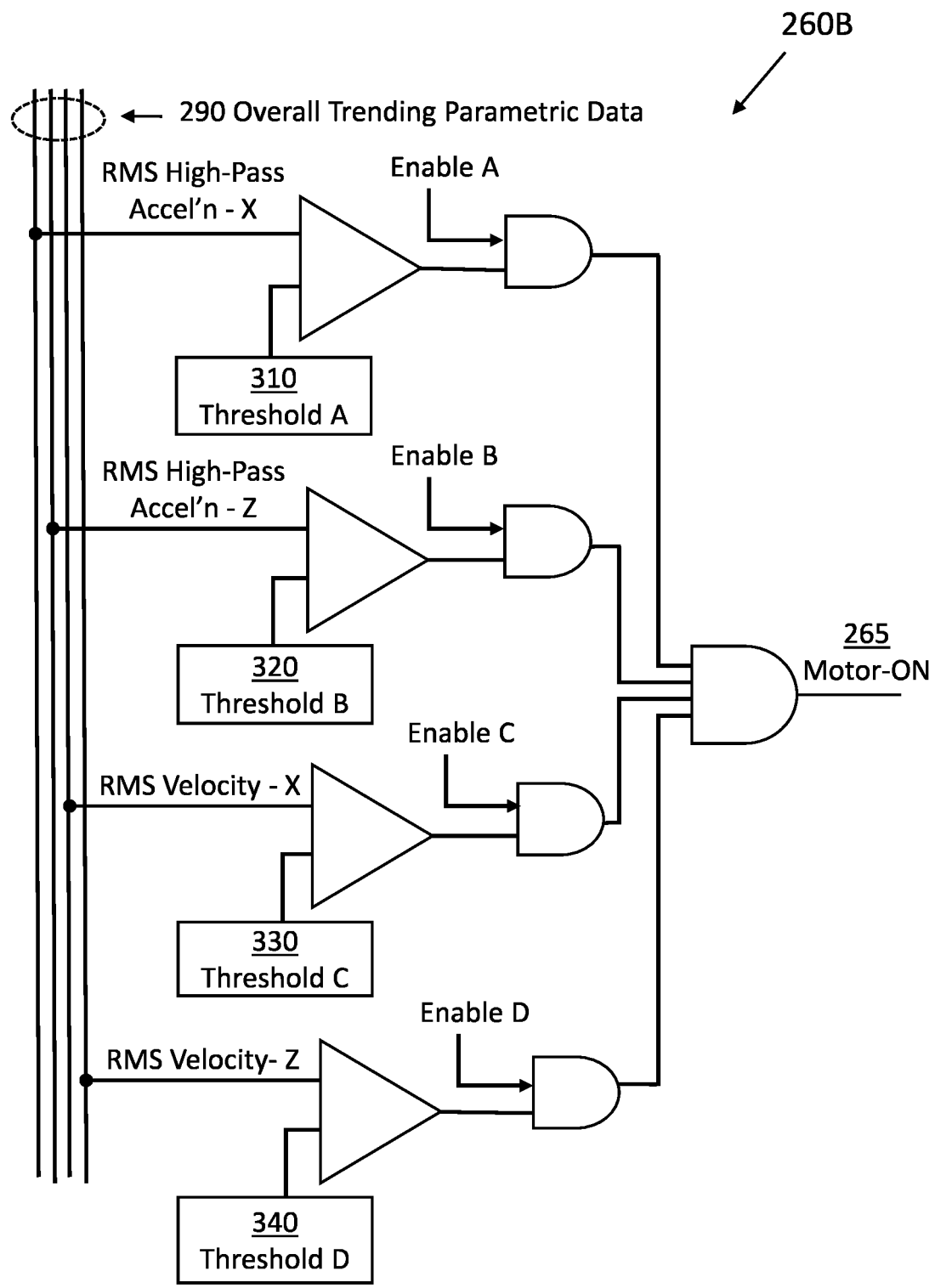
Figure 4:
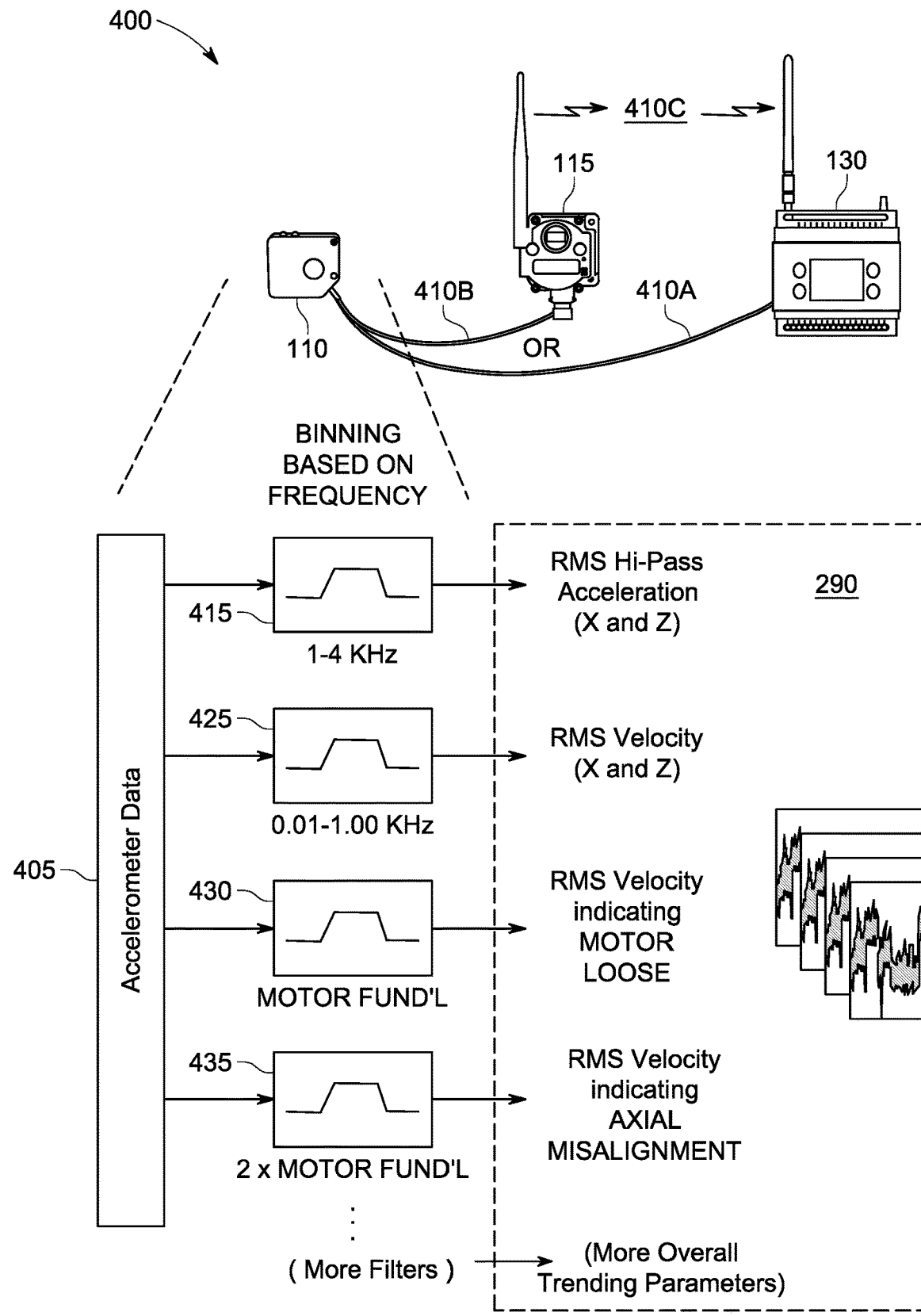
FIG. 4 depicts a block diagram of a binning scheme and failure diagnosis based on frequency of an exemplary VSS data processing algorithm.
Figure 5A:
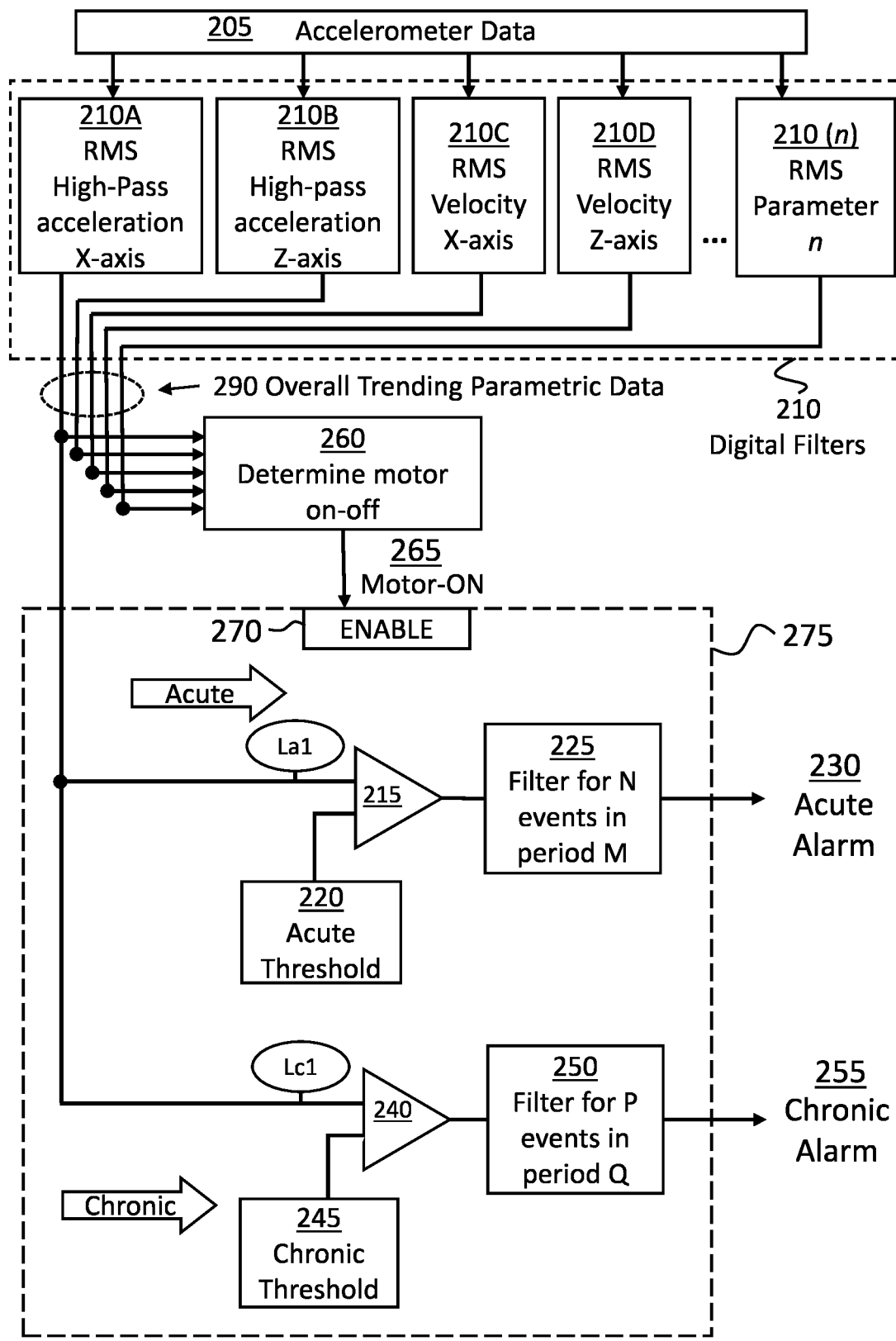
FIGS. 5A, 5B, 5C, and 5D depict schematic views of an exemplary accelerometer data processor with an event filter enable at fixed switch positions.
Figure 5B:
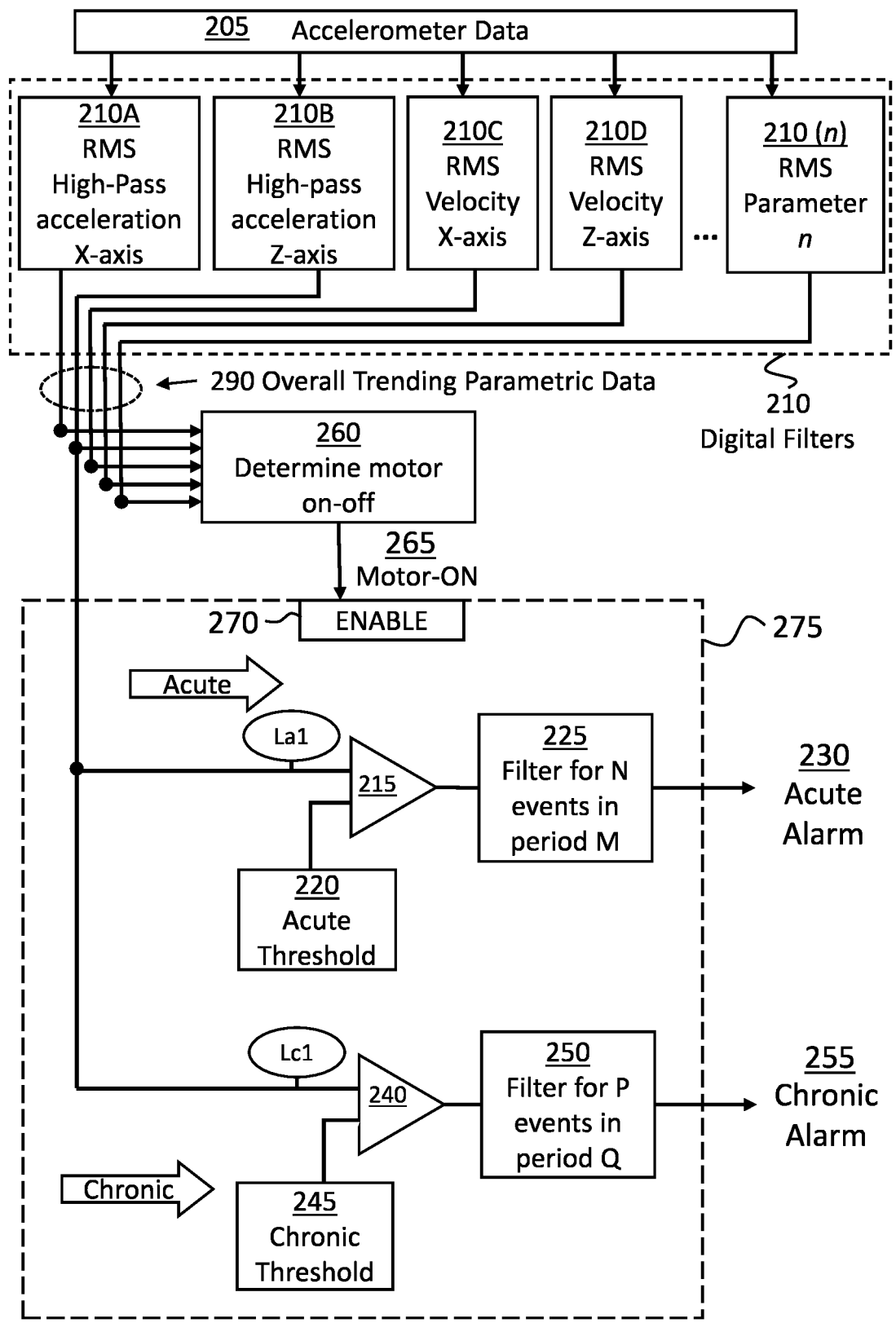
Figure 5C:
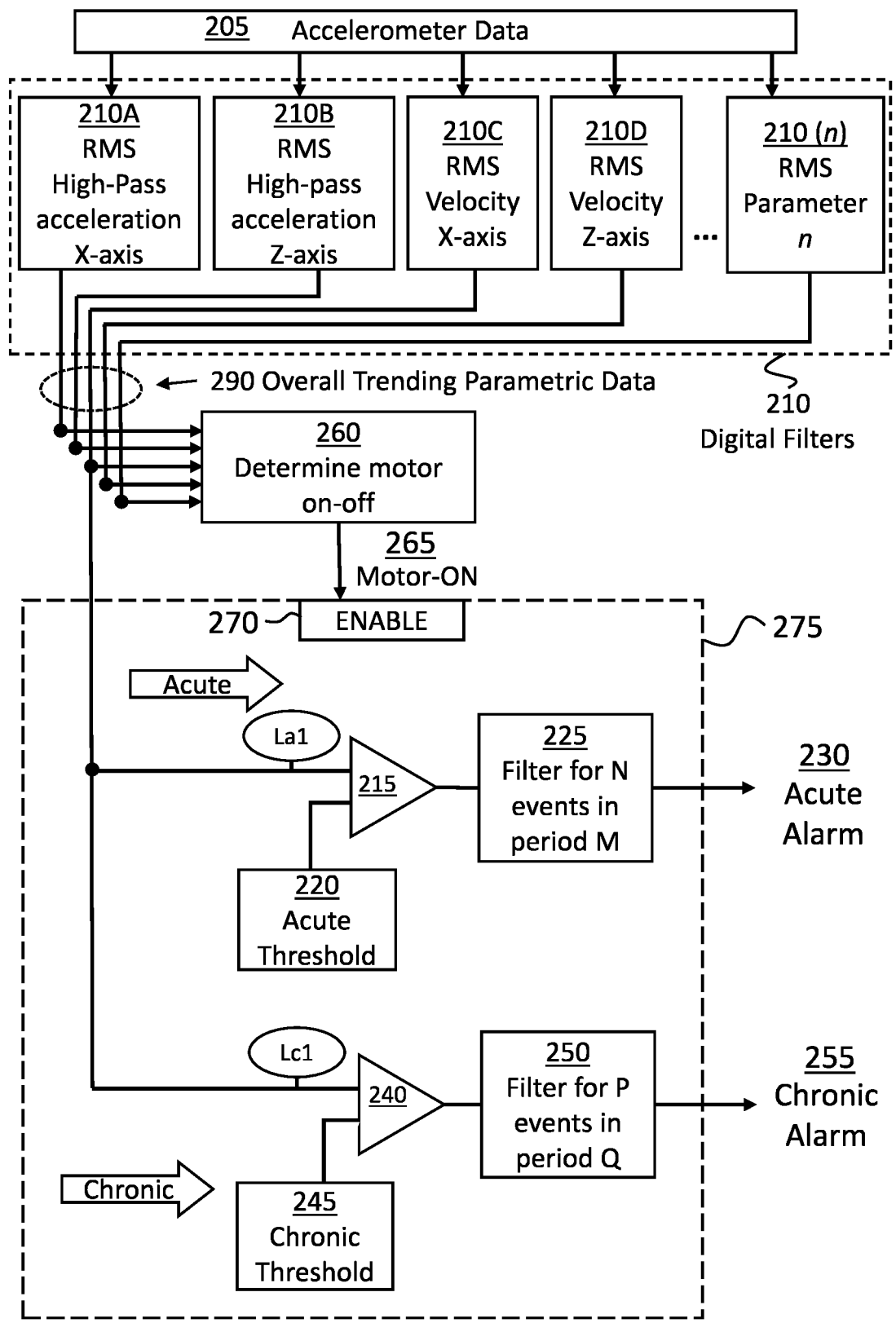
Figure 5D:
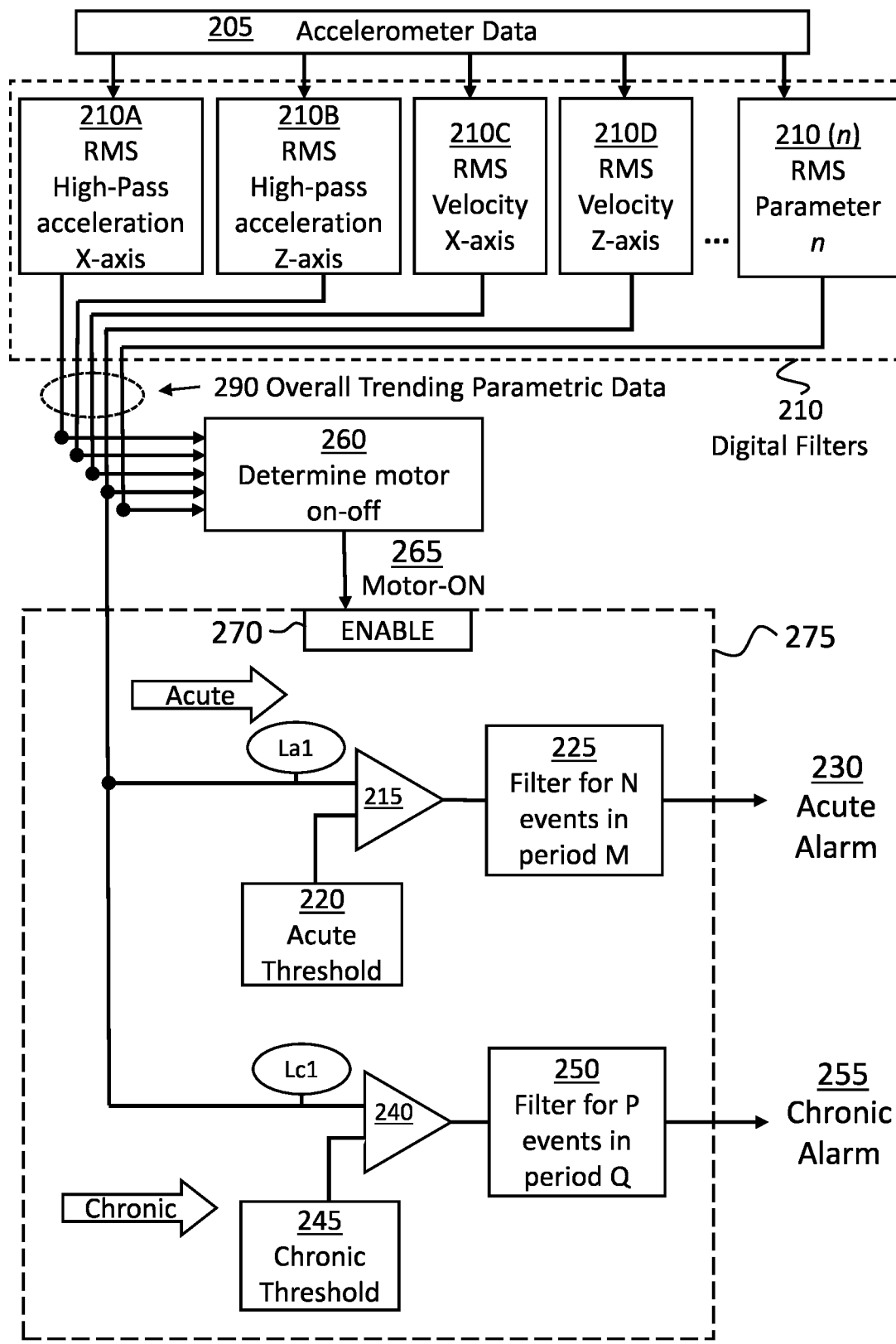
Figure 6A:
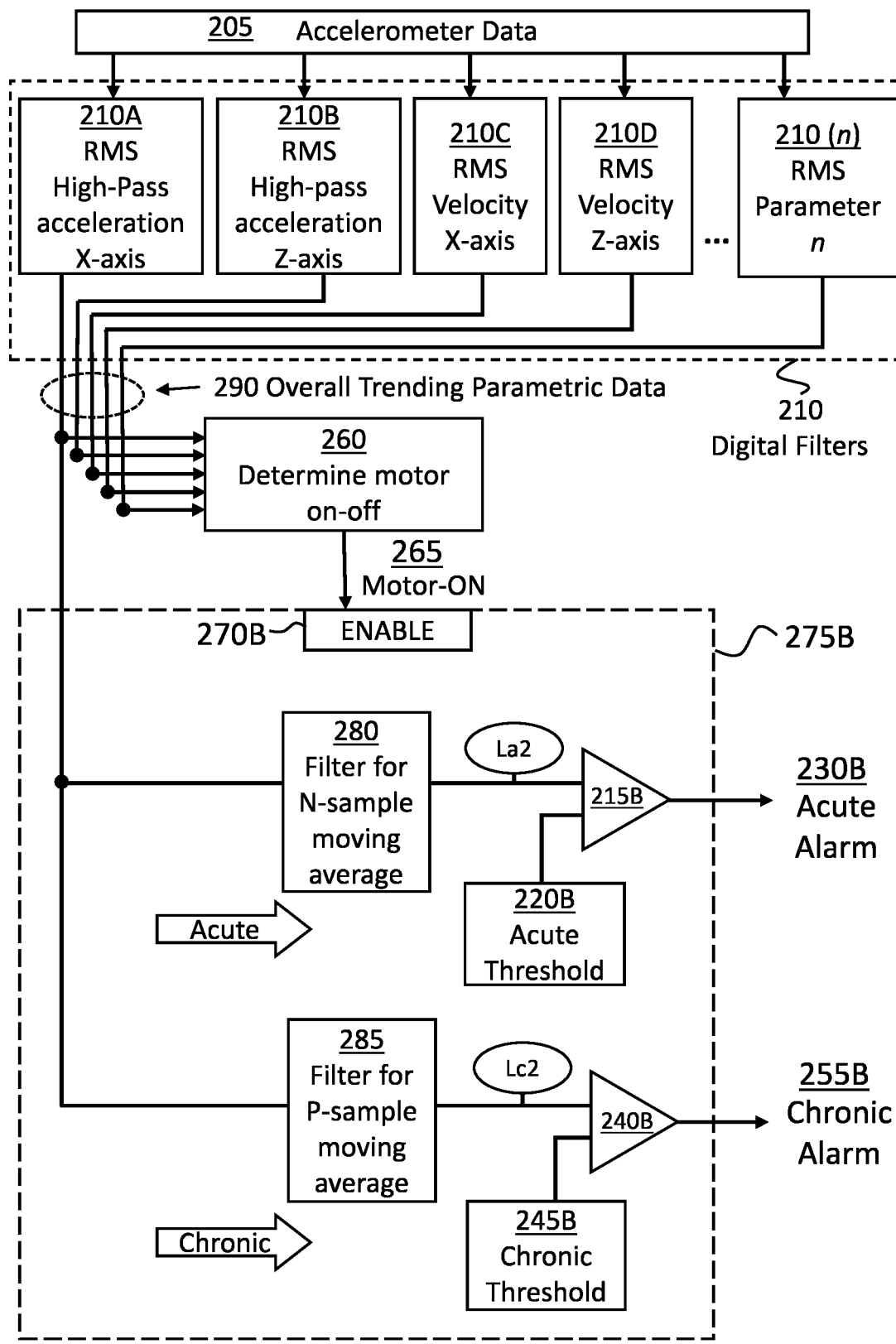
FIGS. 6A, 6B, 6C, and 6D depict schematic views of an exemplary accelerometer data processor with an event filter enable at fixed switch positions.
Figure 6B:
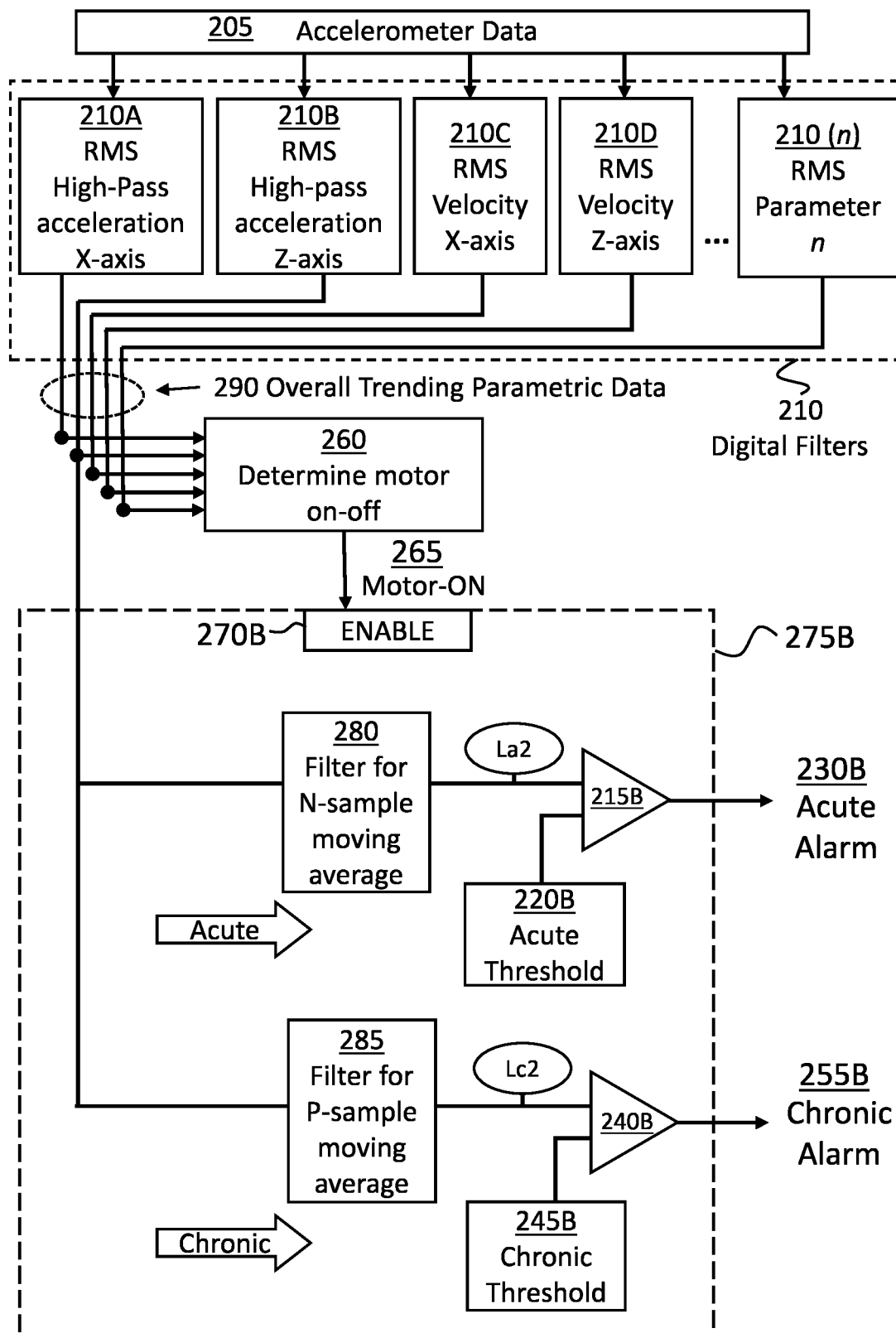
Figure 6C:
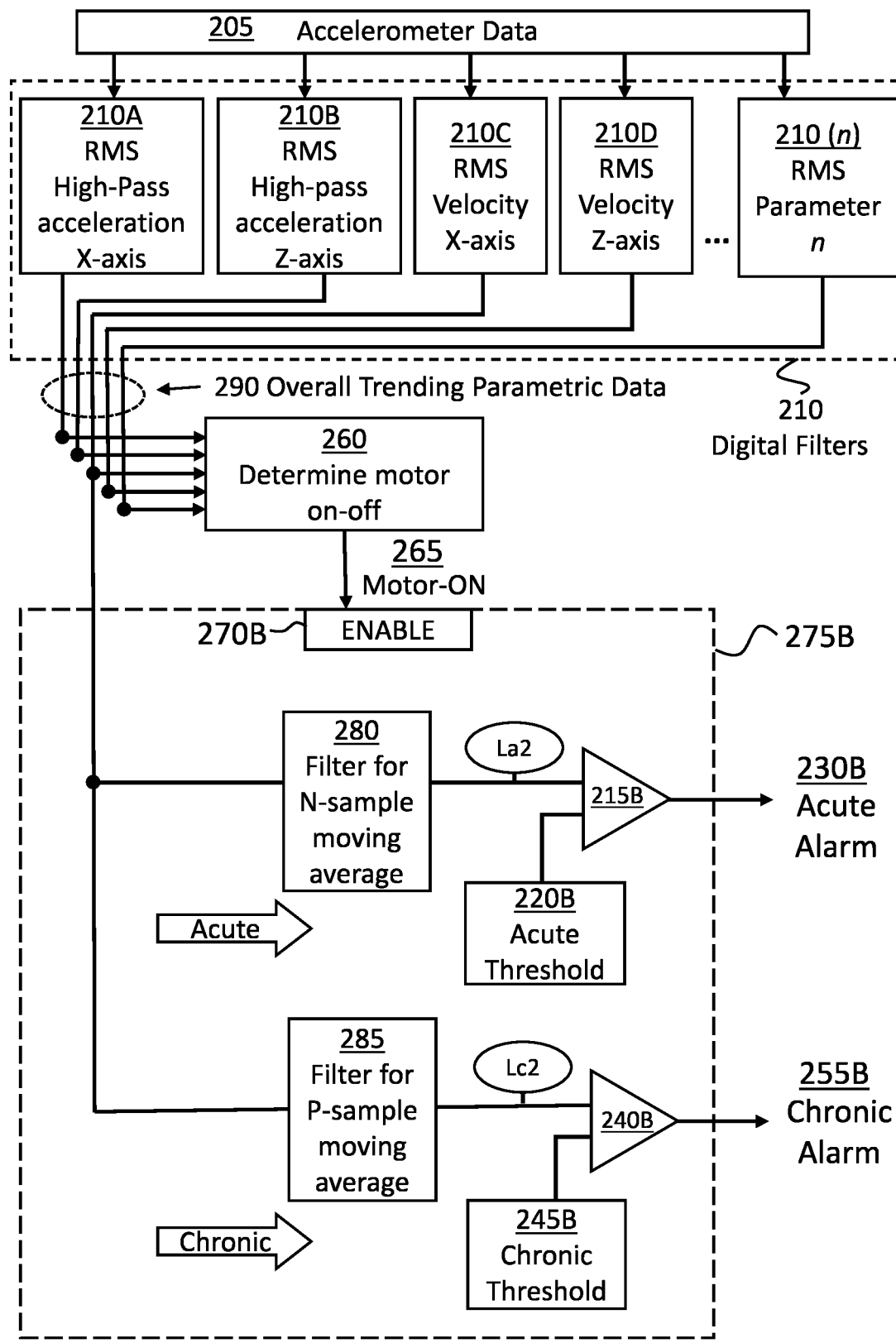
Figure 6D:
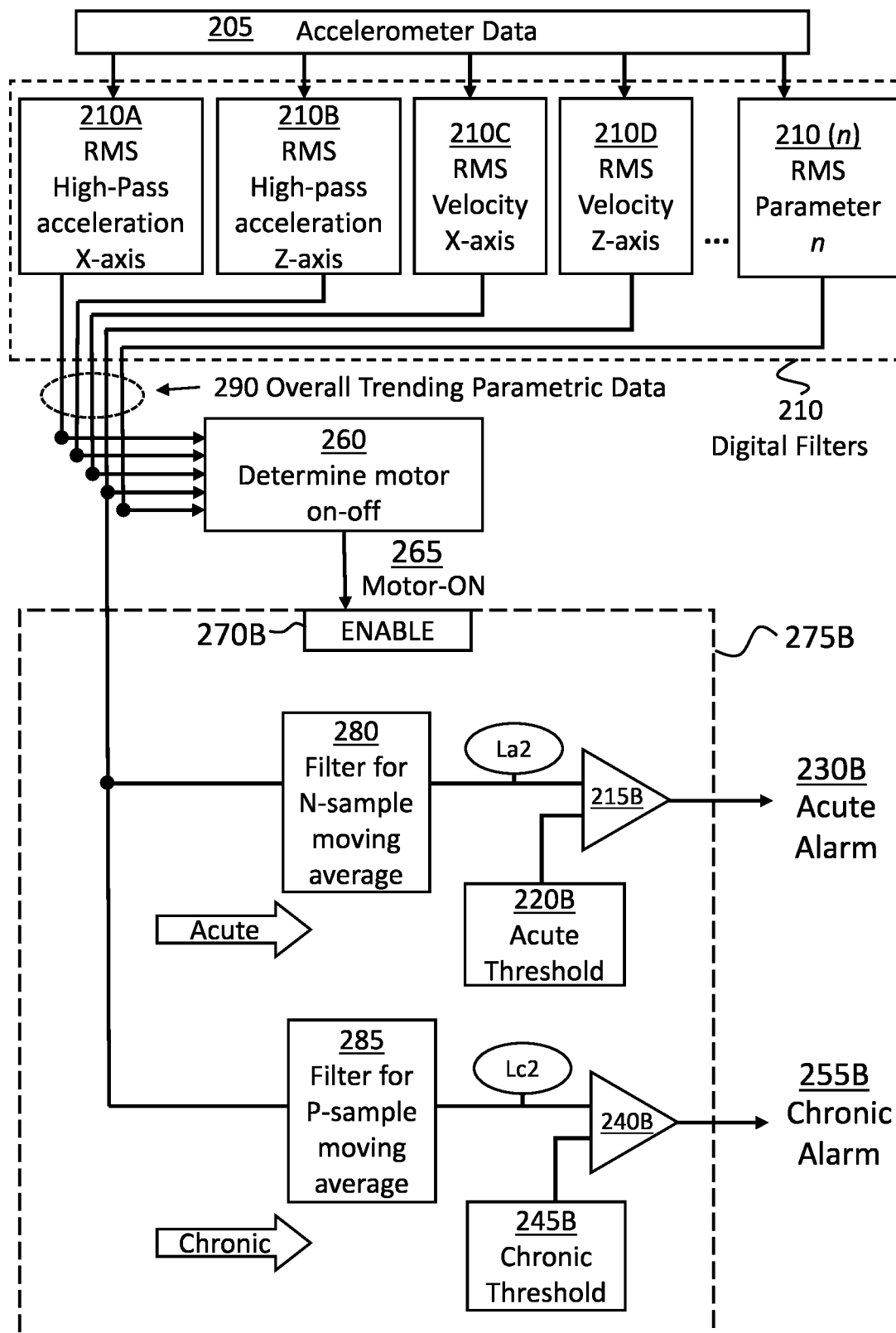

To aid understanding, this document is organized as follows. First, an exemplary use case is briefly introduced with reference to FIG. 1. Next, with reference to FIGS. 2A and 2B, the discussion turns to examination of data processing embodiments that illustrate various methods of filtering an accelerometer dataset to generate various alarms. In FIGS. 3A and 3B the discussion turns to examination of exemplary functional blocks that determine motor on-off based on the accelerometer dataset. FIG. 4 presents an exemplary embodiment that sorts the accelerometer dataset into bins based on frequency content. Specifically, with reference to FIG. 4, the binning splits the dataset into statistical likelihoods of various machine failures. Finally, FIGS. 5A-5D and 6A-6D present specific fixed switch positions of SW1 and SW2, for further clarification of FIGS. 2A and 2B.

Figure 1:
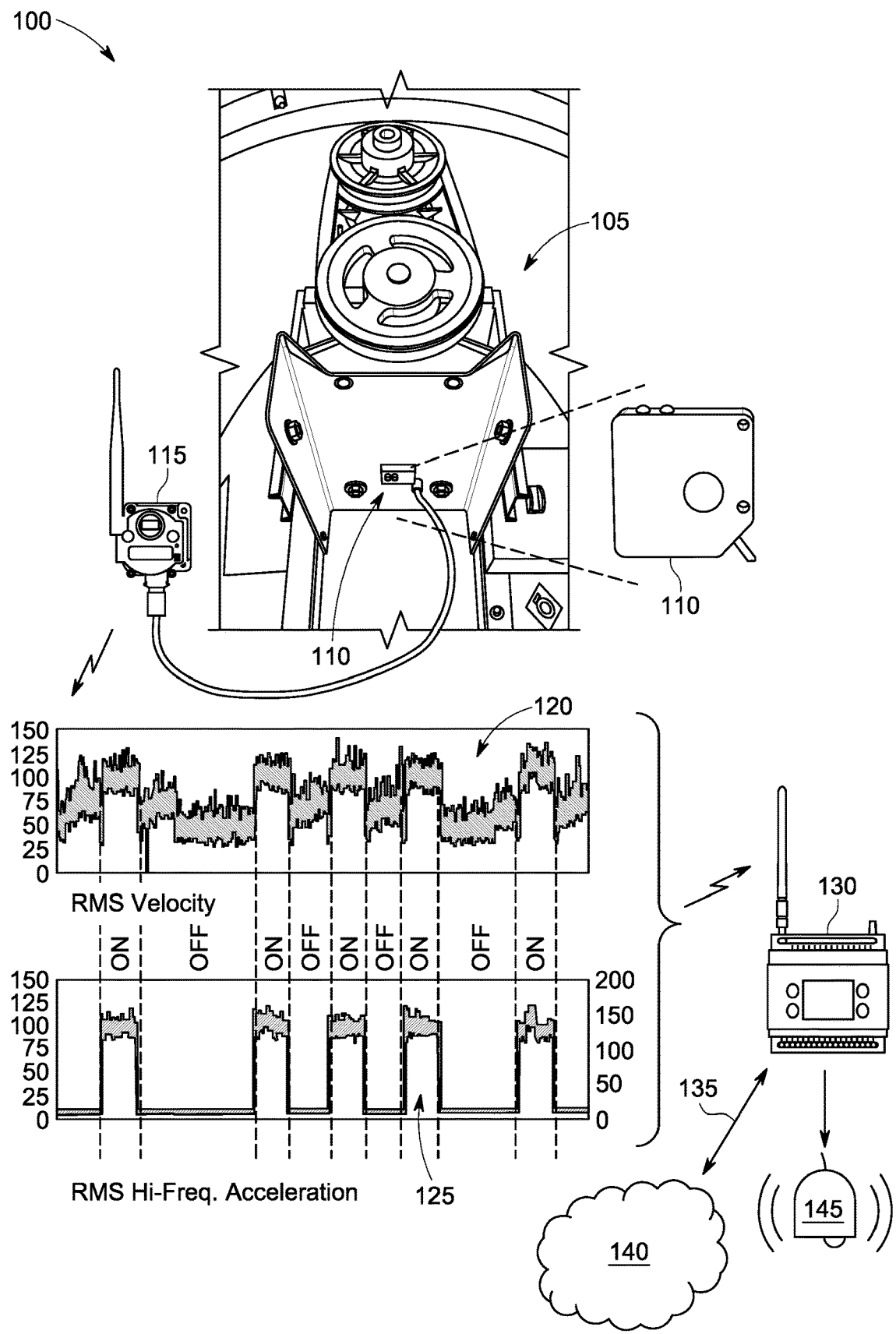
FIG. 1 depicts a plan view of an exemplary vibrational sensing system (VSS) processing accelerometer data into a motor on-off signal.

FIG. 1 depicts a plan view of an exemplary vibrational sensing system (VSS) processing accelerometer data into a "motor on-off" signal. A VSS 100 includes a target motor 105. The target motor 105 may be located at an end-customer's manufacturing facility, for example. The target motor 105 may exist within a manufacturing machine, on a roof providing facility ventilation, or in a variety of other applications. In some applications, the customer may rely on the target motor 105 to continue profitable manufacturing, for example. A VSS sensor 110 is fixedly coupled to the target motor 105. In some examples, various methods may be employed to couple the VSS sensor 110 to the target motor 105. The VSS sensor 110 is in operable communication with a transmitter node 115. The VSS sensor 110 is operable to send overall trending parametric data, for example, RMS velocity data 120 and RMS high-pass acceleration data 125, to the transmitter node 115. The transmitter node 115 sends the overall trending parametric data 120 and 125 via a wireless link to a controller receiver 130. The controller receiver 130 includes a signal processor operable to convert the data 120 and 125 to motor on-off indications (above the graphed data 125). The controller receiver 130 includes an alarm output 145. In some embodiments, the controller may be operable to produce various alarm outputs 145. Further detail on alarm outputs can be found with reference to FIGS. 2A and 2B.

The controller receiver 130 includes a network connection 135. In some examples, the network connection 135 may be a wired ethernet connection which may advantageously provide low-cost, straightforward connection, and some level of security. In some examples, the network connection 135 may be wireless, which may advantageously provide location flexibility. The network connection 135 may be operable to communicate to standard routers and/or gateways and may connect to a broadband network 140 (e.g., Internet). As such, the controller receiver 130 may employ an Internet connection. In some implementations, the signal processing may be run at a remote central computer networked with the controller receiver 130.

As depicted in FIG. 1, the data 120 and 125 may represent RMS vibrational velocity. In some examples, to save power, data 120 and 125 may be transmitted in short bursts separated by longer intervals. The data 120 and 125 may contain a combination of vibrations from, not only the target motor 105, but also adjacent motors, including those within the same machine or within the same mounting frame. Accordingly, vibrational disturbances may be mixed or "cross-coupled" with the vibrations of the target motor 105. Therefore, in some examples, the controller receiver 130, which may include a signal processor, may implement disturbance rejection of cross-coupled machines, effectively filtering out signals unrelated to the target motor 105.

It will be explained in the proceeding figures and descriptions, how the motor on-off indication may advantageously aid in the provision of baseline vibrational data, ignoring vibrational data from an off motor, thereby enabling threshold calculations (during a learn mode) which, in turn, may advantageously enable triggering of diagnostic alarms of various failure conditions or incipient failure conditions (during a run mode). Refer to FIG. 4 for further discussion of various failure conditions. Further, employment of the motor on-off indication as a method to gate vibrational data (e.g., RMS velocity data 120, RMS High-pass acceleration data 125) from an off-motor may advantageously reduce false alarms.

Figure 2A:
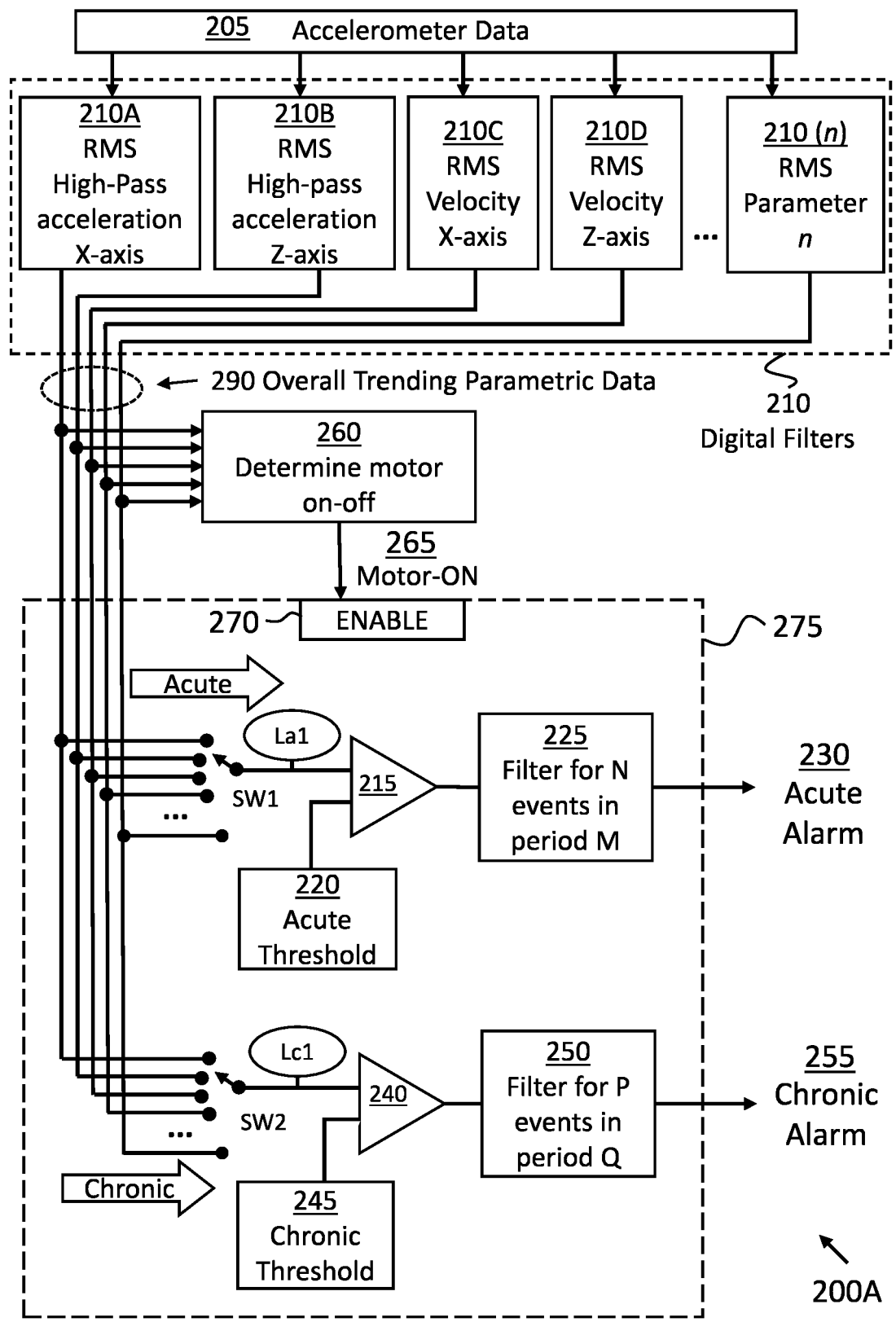
FIGS. 2A and 2B depict schematic views of an exemplary accelerometer data processor with an event filter enable.

FIG. 2A depicts a schematic view of an exemplary accelerometer data processor with an event-filter enable. A data process 200A begins with a set of generated accelerometer data 205 making its way to an array of digital filters 210.

The array of digital filters 210 includes an RMS high-pass acceleration x-axis filter 210A, operable to produce a digital stream of overall RMS acceleration values based on the set of sampled x-axis accelerometer data 205, over a predetermined period of time. The set of sampled accelerometer data 205 may be digitally filtered via a digital signal processor (DSP) for a predetermined frequency band that may be considered "high frequency" in this application.

The array of digital filters 210 also includes an RMS high-pass acceleration z-axis filter 210B, operable to produce a digital stream of overall RMS acceleration values based on the set of sampled z-axis accelerometer data 205, over a predetermined period of time. The set of sampled accelerometer data 205 may be digitally filtered via a digital signal processor (DSP) for a predetermined frequency band that may be considered "high frequency" in this application. For example, the frequency band of 1-4 KHz may be considered high-pass. Other frequency bands may also be included in the definition of high-pass, based on the needs of the application.

The array of digital filters 210 also includes an RMS velocity x-axis filter 210C, operable to produce a digital stream of overall RMS velocity values based on the set of sampled x-axis accelerometer data 205, over a predetermined period of time. The set of sampled accelerometer data 205 may be digitally filtered via a digital signal processor (DSP) for a predetermined frequency band, then digitally integrated to produce velocity.

The array of digital filters 210 also includes an RMS velocity z-axis filter 210D, operable to produce a digital stream of overall RMS velocity values based on the set of sampled z-axis accelerometer data 205, over a predetermined period of time. The set of sampled accelerometer data 205 may be digitally filtered via a digital signal processor (DSP) for a predetermined frequency band, then digitally integrated to produce velocity.

The array of digital filters 210 may also include multiple other filters 210($n$), operable to produce various digital streams of overall RMS values based on the set of sampled accelerometer data 205. In some embodiments, the digital filters 210 may be operable to eliminate data outliers. As such, the outputs of the digital filters 210 represent overall trending parametric data 290 suitable for proceeding signal processing.

An RMS filtering implementation has been described. Nevertheless, it will be understood that various filtering techniques may be employed. For example, advantageous results may be achieved if the accelerometer data were filtered using high-pass, low-pass, band-pass, peak detection or kurtosis.

The signal outputs from the digital filters 210 are fed into two branches: a top "Acute Alarm" branch and a bottom "Chronic Alarm" branch. Acute alarms are intended to detect short-term failure conditions. Chronic alarms are intended to detect long-term failure trends.

In an illustrative acute alarm example, a motor moving a conveyor on an assembly line may be operable to move crates of empty bottles. If for example, a worker accidentally places a much heavier crate of filled bottles on the conveyor, an acute alarm may activate alerting workers of an issue. In some examples, much larger discrepancies in load may be set within the VSS to catch larger issues, for example, a worker placing a refrigerator on a conveyor built for microwave ovens.

In an illustrative chronic alarm example, a factory ventilation unit may be operable to move fresh air into the building. Over several weeks, for example, a bearing within the motor driving the ventilation unit may slowly degrade generating vibrational anomalies. These anomalies may activate a chronic alarm, alerting factory personnel of an incipient motor failure within the ventilation unit. Maintenance personnel may proactively order replacement parts and repair the ventilation unit in advance of the mechanical failure.

Accordingly, various types of acute and chronic alarms may be generated by implementation of the depicted diagram, by customizing the acute threshold, the chronic threshold, and other variables including M, N, P, and Q.

Continuing the figure description, the signal outputs from the digital filters 210 are fed into a comparator 215, via a switch SW1. The switch SW1 may be controlled by a VSS computer processor. The processor may select, via the switch SW1, which particular signal output from the digital filters 210 will be monitored for various alarm conditions. In some examples, the switch SW1 may be implemented within the processor, and may not be an actual switch, but may be implemented by reading a selected register. Further, each of the signal outputs from the digital filters 210, may be monitored one at a time in a round-robin fashion, by implementation of the switch SW1 function, thereby providing time-division multiplexing of alarm monitoring.

The switch SW1 feeds the comparator 215 is operable to determine an acute alarm condition based on a customizable acute threshold 220. The output of the comparator 215, indicating an alarm condition when the output of the selected digital filter 210 crosses the threshold 220, is fed into a digital filter 225. In the depicted example, the digital filter 225 produces a true output when N input events occur within a period M. In various examples, the variables N and M may be customizable by the end user, or may remain at default values. The output of the digital filter 225 is defined as an acute alarm 230. This is discussed in exemplary form in the section labeled "Acute and Chronic Alarms" below.

The signal output from the digital filter 210 is also fed into a comparator 240 via switch SW2. The switch SW2 provides a parallel function as described above for the switch SW1. The comparator 240 is operable to determine a chronic alarm condition based on a customizable chronic threshold 245. The output of the comparator 240, indicating an alarm condition when the output of the selected digital filter 210 crosses the threshold 245, is fed into a digital filter 250. In the depicted example, the digital filter 250 produces a true output when P input events occur within a period Q. In various examples, the variables P and Q may be customizable by the end user, or may remain at default values. The output of the digital filter 250 is defined as a chronic alarm 255. Again, this is discussed in exemplary form in the section labeled "Acute and Chronic Alarms" below.

In an illustrative "learn mode" example, a sensor mounted to a monitored motor produces overall trending parametric data 290, for example, RMS High-Pass acceleration data (x-axis and z-axis) 210A and 210B, RMS velocity data (x-axis and z-axis) 210C and 210D, and other trending parametric data, for the motor which may be turned on and off during its normal operation. Overall trending parametric data 290 during the motor-off time is not to be acquired. In some examples, the overall trending parametric data 290 may be acquired but may not be used in threshold calculations. Acquiring or utilizing the data during the motor-off time may result in inaccurate baseline measurements which may result in inaccurate alarm thresholds. In "run-mode", acquiring data during motor-off time may result in triggering alarms based on irrelevant data. Therefore, a motor on-off circuit 260 fed by the digital filters 210 is included in the data process 200A. The motor on-off circuit 260 produces a Motor-ON logic signal 265. The Motor-ON logic signal 265 drives an enable function 270. The enable function 270 is employed as a gate for a filtering/detection block 275. Various embodiments of the motor on-off circuit 260 are described further in FIGS. 3A and 3B.

If the Motor-ON logic signal 265 is true, then the processes within the filtering/detection block 275 are actively processing, and the signals coming from the digital filters 210 are considered valid for use. If the Motor-ON logic signal 265 is false, then the processes within the filtering/detection block 275 are prevented from triggering alarms 230 and 255.

In various implementations, signals entering the comparators 215 and 240, respectively labeled La1 and Lc1, are points used to collect data during a learning mode. The VSS employs the learning mode to collect filtered vibrational data while the motor is running. This collected data is used to "baseline" normal running vibrations. The baselines may be used to calculate various alarm thresholds (for example, acute and chronic thresholds 220 and 245). During the learning mode, the Motor-ON logic signal 265 connected to the enable function 270 is employed to control the baseline operation. Only data collected during the active enable function 270 may be used to calculate the vibrational running baseline.

In some examples, multiple processors, or multiple software threads may be employed to monitor one or more of the signal outputs from the digital filters 210 simultaneously. Further, multiple blocks 275 may be employed within the data process 200A, each implementing one position of the switches SW1 and SW2, as exemplified in FIGS. 5A, 5B, 5C and 5D. Such parallel monitoring may provide a comprehensive monitoring of all the different output alarm signals.

Figure 2B:
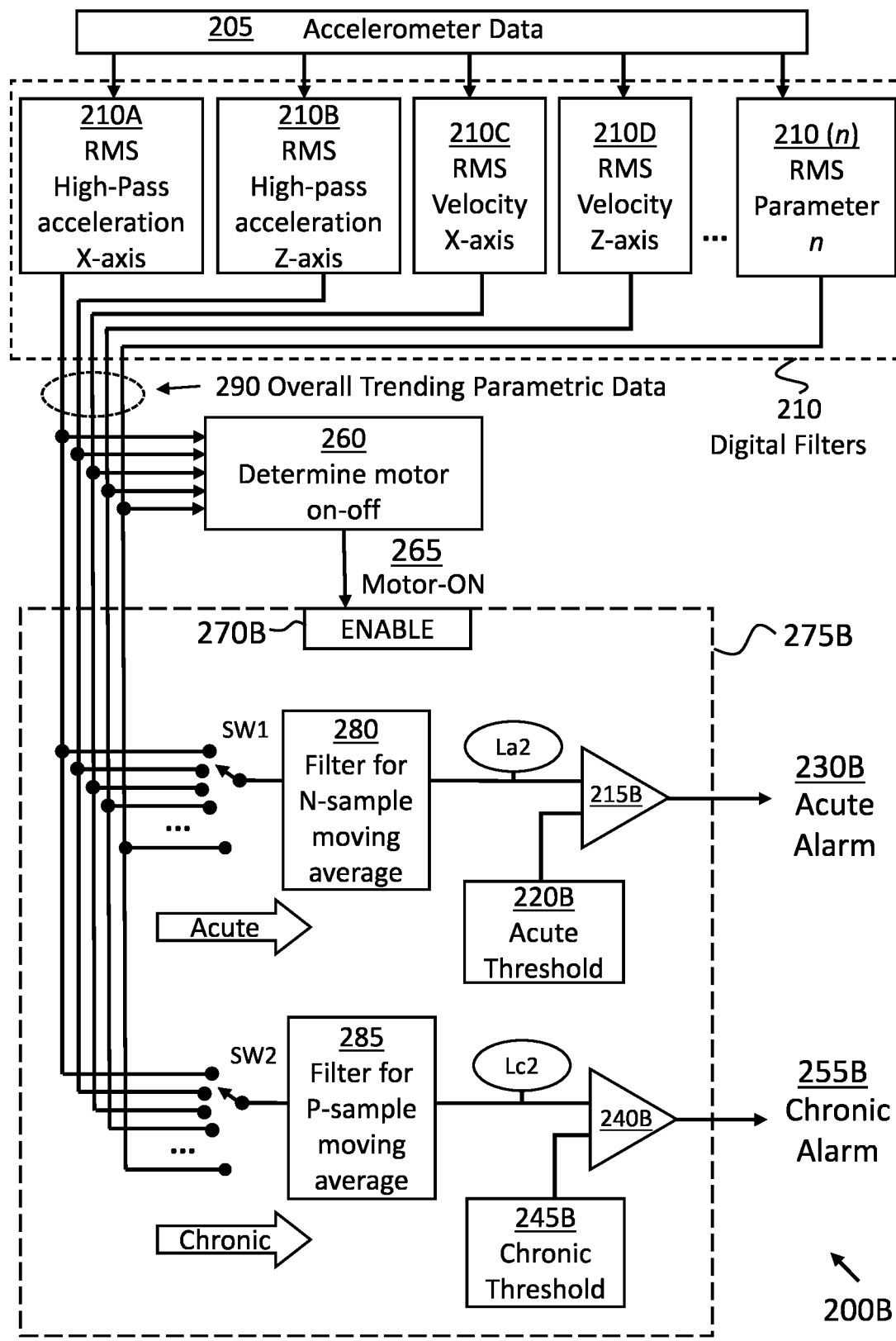

FIG. 2B depicts a schematic view of an exemplary accelerometer data processor with a data-filter enable. A data process 200B begins with the accelerometer data 205 making its way to the digital filters 210. In some embodiments, the digital filters 210 are operable to eliminate data outliers. As such, the outputs of the digital filters 210 may F As discussed in FIG. 2A, the signal outputs from the digital filters 210 are fed into two branches; a top "Acute Alarm" branch and a bottom "Chronic Alarm" branch. Accordingly, various types of acute and chronic alarms may be generated by implementation of the depicted diagram, by customizing the acute threshold, the chronic threshold, and other variables including N, and P.

The signal outputs from the digital filters 210 are fed into an N-sample moving average filter 280, via the switch SW1. The switch SW1 may be controlled by a VSS computer processor. The processor may select, via the switch SW1, which particular signal output from the digital filters 210 will be monitored for various alarm conditions. In some examples, the switch SW1 may be implemented within the processor, and may not be an actual switch, but may be implemented by reading a selected register. Further, each of the signal outputs from the digital filters 210, may be monitored one at a time in a round-robin fashion, by implementation of the switch SW1 function, thereby providing time-division multiplexing of alarm monitoring.

The switch SW1 feeds the N-sample moving average filter 280. In various examples, the variable N may be customizable by the end user, or may remain at a default value. The output of the moving average filter 280 feeds a comparator 215B. The comparator 215B is operable to determine an acute alarm condition based on a customizable acute threshold 220B. The output of the comparator 215B is defined as an acute alarm 230B.

The signal outputs from the digital filters 210 are also fed into a P-sample moving average filter 285 via the switch SW2. The switch SW2 provides a parallel function as described above for the switch SW1. In various examples, the variable P may be customizable by the end user, or may remain at a default value. The output of the moving average filter 285 feeds a comparator 240B. The comparator 240B is operable to determine a chronic alarm condition based on a customizable chronic threshold 245B. The output of the comparator 240B is defined as a chronic alarm 255B.

In an illustrative "learn mode" example, a sensor mounted to a monitored motor produces overall trending parametric data 290, for example, RMS High-Pass acceleration data (x-axis and z-axis) 210A and 210B, RMS velocity data (x-axis and z-axis) 210C and 210D, and other trending parametric data, for the motor which may be turned on and off during its normal operation. Overall trending parametric data 290 during the motor-off time is not to be acquired. In some examples, the overall trending parametric data 290 may be acquired but may not be used in threshold calculations. In these examples, acquisition of the overall trending parametric data 290 may be recorded and may be employed for various purposes, for example, to determine differences between the running and not running motor states. Acquiring or utilizing the data during the motor-off time may result in inaccurate baseline measurements which may result in inaccurate alarm thresholds. In "run-mode", acquiring data during motor-off time may result in triggering alarms based on irrelevant data. Therefore, the motor on-off circuit 260 fed by the digital filters 210 is included in the data process 200B. The motor on-off circuit 260 produces the Motor-ON logic signal 265. The Motor-ON logic signal 265 drives an enable function 270B. The enable function 270B is employed as a gate for a filtering/detection block 275B. Various embodiments of the motor on-off circuit 260 are described further in FIGS. 3A and 3B.

If the Motor-ON logic signal 265 is true, then the processes within the filtering/detection block 275B are actively processing, and the signals coming from the digital filters 210 are considered valid for use. Accordingly, the moving average is calculated on the data.

If the Motor-ON logic signal 265 is false, then the data samples are not folded into the moving average. Worded another way, the moving average freezes when the motor is not running and last data value is held until the motor resumes running. Accordingly, the processes within the filtering/detection block 275B are prevented from triggering alarms 230B and 255B.

In this way, an accurate filtered version of the data set is produced when the motor is running. This data set may be compared to the alarming thresholds to create accurate overall "check engine light" events.

In various implementations, signals exiting the moving average filters 280 and 285, respectively labeled La2 and Lc2, are points used to collect data during a learning mode. The VSS employs the learning mode to collect filtered vibrational data while the motor is running. This collected data is used to "baseline" normal running vibrations. The baselines are in turn used to calculate various alarm thresholds (for example, acute and chronic thresholds 220B and 245B). During the learning mode, the Motor-ON logic signal 265 connected to the enable function 270B is employed to control the baseline operation. Only data collected during the active enable function 270B is used to calculate the vibrational running baseline.

A moving average filtering implementation has been described. Nevertheless, it will be understood that various filtering techniques may be employed. For example, advantageous results may be achieved if the overall trending parametric data 290 were filtered using a low-pass filter, weighted moving average, gaussian, window, multiple-pass moving average or various smoothing filters.

In some examples, multiple processors, or multiple software threads may be employed to monitor one or more of the signal outputs from the digital filters 210 simultaneously. Further, multiple blocks 275 may be employed within the data process 200B, each implementing one position of the switches SW1 and SW2, as exemplified in FIGS. 6A, 6B, 6C and 6D. Such parallel monitoring may provide a comprehensive monitoring of all the different output alarm signals.

FIG. 3A depicts a schematic view of an exemplary motor on-off determination circuit. In FIG. 3A, the motor on-off circuit 260 introduced in FIGS. 2A and 2B is further detailed in an exemplary embodiment 260A. In this embodiment, the Motor-ON logic signal 265 will be active when ANY of the following events occur:
  a) when the RMS high-pass acceleration in the x-axis crosses a threshold 310.
  b) when the RMS high-pass acceleration in the z-axis crosses a threshold 320.
  c) when the RMS velocity in the x-axis crosses a threshold 330.
  d) when the RMS velocity in the z-axis crosses a threshold 340.

In each case the thresholds 310, 320, 330, and 340 may be pre-determined thresholds. A system processor within a controller (e.g., FIG. 1, item 130) may control a gating enable signal for each threshold crossing event. The enables (depicted as Enable A, Enable B, Enable C, and Enable D) provides flexibility by allowing the system to choose which overall trending parametric data 290 to employ for generating the Motor-ON logic signal 265.

FIG. 3B depicts a schematic view of an exemplary motor on-off determination circuit. In FIG. 3B, the motor on-off circuit 260 introduced in FIGS. 2A and 2B is further detailed in an exemplary embodiment 260B. In this embodiment, the Motor-ON logic signal 265 will be active when ALL of the following events occur:
  a) when the RMS high-pass acceleration in the x-axis crosses the threshold 310.
  b) when the RMS high-pass acceleration in the z-axis crosses the threshold 320.
  c) when the RMS velocity in the x-axis crosses the threshold 330.
  d) when the RMS velocity in the z-axis crosses the threshold 340.

With reference back to FIG. 1, the VSS includes the sensor 110 coupled to the mechanical drive unit, which may include a various motor types. The sensor 110 is operable to produce vibrational data which may include, for example, RMS velocity data 120 and RMS high-pass acceleration data 125. The vibrational data sent from the sensor 110 may include an array data referred to as overall trending parametric data (FIG. 2, item 290). FIG. 3A depicts a schematic view of an exemplary method to produce the Motor-ON logic signal 265 exemplified in FIGS. 2A and 2B from the overall trending parametric data (FIG. 2, item 290). As explained in FIGS. 2A and 2B, the motor on-off signal (Motor-ON logic signal 265) may provide a gating signal to produce a long-term moving average which may advantageously be used to calculate accurate vibrational baselines, standard deviations, and other statistical measures from which alarm thresholds may be generated, and nuisance alarms may be avoided.

The overall RMS high-pass acceleration may be employed as a criterion for motor on-off in many applications. RMS high-pass acceleration couples very inefficiently across connected machines and motors within the same machine or frame, so it tends to be isolated to the machine or motor of interest. Accordingly, an absolute threshold criterion may be employed to predict motor on-off for some machines or motors. In some examples, absolute thresholds of about 5 mG, 10 mG, 15 mG, 20 mG, 25 mG, 30 mG, 35 mg, 40 mG, 45 mG or about 50 mG may be employed. The unit "mG" stands for "milli-gravity" which is a scale of acceleration approximately equal to 9.8 mm/sec$^2$ A justification for an on-off threshold is presented in the following illustrative example. An intrinsic noise level for the sensor 110 may be very stable at about 10 mG. In such examples, the acceleration thresholds 310 and 320, for motor on-off, may be set at twice the intrinsic noise level, or 20 mG. In contrast, and in some examples, rotating mechanical drive units, when on, may produce more than 30 mG of steady-state RMS high-pass acceleration, thereby producing a true Motor-ON indication, well above the intrinsic noise level and above the acceleration threshold.

In some applications, some machines/motors may produce very little high-frequency acceleration signal. Therefore, in some embodiments, a combination of multiple axes and/or multiple variables may be employed, which may advantageously produce a positive on-off signal, due to monitoring of more than one axis.

In some embodiments, multiple parameters may be logically "OR-ed." For example, as depicted in FIG. 3A, in the current context with the parameters available, RMS velocity may be logically "OR-ed" with RMS high-pass acceleration. Because multiple parameters are employed in this approach, each individual on/off threshold may be set higher than if either parameter were considered independently. The higher individual on/off threshold may advantageously provide more margin for false positives on any given variable.

In an illustrative example, the RMS high-pass acceleration Motor-ON threshold 310 and 320 may be about 5 mG, 10 mG, 15 mG, 20 mG, 25 mG, 30 mG, 35 mg, 40 mG, 45 mG or about 50 mG. In a related illustrative example, the overall RMS velocity Motor-ON thresholds 330 and 340 may be about 0.05 in/sec. These values may determine motor on-off conditions across a variety of machines and scenarios.

In some embodiments, the motor on-off signal (Motor-ON logic signal 265) may be an on-off flag. The on-off flag may be determined in the actual sensor transmitter, instead of the controller receiver. In such embodiments, the sensor may determine the running state of the coupled target motor. Further, in various examples, the sensor may employ any of the methods described in this application referring to the generation of the motor on-off signal (Motor-ON logic signal 265) to determine the on-off flag.

In some implementations, the on-off flag may be placed in the least significant bit (LSB) or most significant bit (MSB) of one of the byte variables pushed out of the sensor's communication protocol. For example, one unused bit within the temperature variable may be employed for the on-off flag. In some implementations, a dedicated byte variable may be employed to hold the on-off flag.

In some examples, motor on-off detection may be accomplished by the selection of parameters and thresholds that both reliably indicate when the motor is running, and applies to a wide range of machines/motors without the user needing to "tune" thresholds for their individual machines/motors per installation. Accordingly, in some embodiments, a global absolute set of motor on-off criteria may be employed. Further, the employment of the RMS high-pass acceleration as the on-off criterion may provide that reliable indication.

In some embodiments, the RMS high-pass acceleration (FIGS. 2A and 2B, items 210A and 210B) may be monitored during a learn mode. One of the purposes of the learn mode may be to set the RMS high-pass acceleration thresholds (e.g., FIGS. 3A and 3B, items 310, 320, 330 and 340). In such embodiments, the thresholds (e.g., FIGS. 3A and 3B, items 310, 320, 330 and 340) may be set at a level between the intrinsic noise of the sensor and the average peak level of the RMS high-pass acceleration. An exemplary waveform captured during the learn mode is shown in the data FIG. 1 item 125. It should be noted that setting an on-off threshold for the RMS high-pass signal (as exemplified by the motor on-off indications in FIG. 1 above the graphed data 125), may be more straight-forward than setting an on-off threshold from the RMS velocity as exemplified in the sensor data (FIG. 1, item 120). The exemplary sensor data 120 representing RMS velocity shows instances where some ON indications are lower than some OFF indications (as shown just below the graphed data 120). Accordingly, in the RMS velocity data (FIG. 1, item 125) there is no one-static-threshold above which is on, and below which is OFF. In contrast, by implementation of the Hi-Frequency Acceleration methods described in this document, the on-off indications (FIG. 1 above the data 125), clearly possess a much higher degree of distinction between the levels indicating ON and the levels indicating OFF.

FIG. 4 depicts a block diagram of a binning scheme and failure diagnosis based on frequency, of an exemplary VSS data processing algorithm. A VSS data processing algorithm 400 includes the sensor 110. The sensor 110 includes an accelerometer 405. The time-domain data stream from the accelerometer 405 is processed by a processor internal to the sensor 110. The processor is operable to produce the array of overall trending parametric data 290 which are output from the sensor 110. In some examples, a user site may couple the output from the sensor 110 directly to the controller receiver 130 via a hardwire connection 410A. In some examples, a user site may couple the output from the sensor 110 to the transmitter node 115 via a hardware connection 410B which may be operable to send the Overall Trending Parameters wirelessly to the controller receiver 130 via a wireless channel 410C.

In an illustrative example, the overall trending parametric data 290 may be RMS frequency-domain data, filtered and converted from the time-domain data from the accelerometer 405, and may correspond to a monitored factory machine/motor. In some examples, one or more machines/motors may be monitored in a single installation by multiple sensors 110 coupled to a single controller receiver 130. The controller receiver 130 may be operable to process the overall trending parametric data 290.

The output of the accelerometer 405 is operatively coupled to a band-pass filter 415. In the depicted example, the band is 1 KHz to 4 KHz. In some examples, the 1 KHz to 4 KHz band may represent RMS High-Pass Acceleration. The output signal produced from the 1 KHz to 4 KHz band-pass filter 415 may be compared to a threshold, as described in FIG. 3A and FIG. 3B, to produce a Motor-ON logic signal, as employed in FIGS. 2A and 2B.

The output of the accelerometer 405 is operatively coupled to a band-pass filter 425. In the depicted example, the band is 0.01 KHz to 1.00 KHz. In some examples, the 0.01 KHz to 1.00 KHz band may represent RMS Velocity. The output signal produced from the 0.01 KHz to 1.00 KHz band-pass filter 425 may be compared to a threshold, as described in FIGS. 2A and 2B, and may produce the acute alarm 230 and 230B or the chronic alarm 255 and 255B. These alarms generated from the RMS velocity may indicate a general motor failure state of a target motor.

The output of the accelerometer 405 is operatively coupled to a band-pass filter 430. In the depicted example, the band surrounds a motor fundamental frequency by about 20%. In some examples, 20-40 Hz may represent the motor fundamental frequency. In some examples, 50-70 Hz may represent the motor fundamental frequency. In various examples, the band surrounding the motor fundamental frequency may represent a loose motor state of a target motor. The output signal produced may be compared to a threshold, as described in FIGS. 2A and 2B, and produce the acute alarm 230 and 230B or the chronic alarm 255 and 255B.

The output of the accelerometer 405 is operatively coupled to a band-pass filter 435. In the depicted example, the band surrounds twice the motor fundamental frequency by about 20%. In some examples, 45-130 Hz may represent twice the motor fundamental frequency. In various examples, the band surrounding twice the motor fundamental frequency may represent an axial misalignment state of a target motor. The output signal produced from the band-pass filter 435 may be compared to a threshold, as described in FIGS. 2A and 2B, and produce the acute alarm 230 and 230B or the chronic alarm 255 and 255B.

Although various embodiments have been described with reference to the figures, other embodiments are possible. For example, in some embodiments, a sensor may directly connect to an ethernet port, acting as if it were a computing device within a facility's computer network. In some examples, a single sensor system may be wireless, and may connect to a facility's Wi-Fi network. In some embodiments, instead of connection to a local facility network, the VSS may connect to an external network such as a cellular data network. Accordingly, all references in this document relating to connection to the Internet, may employ a cellular data link.

Continuous Vibration Monitoring

In some embodiments, the VSS may monitor one or more mechanical drive units. A sensor may be placed upon each mechanical drive unit to sense velocity and acceleration, and may be converted within the sensor to RMS velocity and RMS high-pass acceleration. Each sensor may be connected to a dedicated transmitter node. In some examples, one or more sensors may be connected to a single transmitter node. RMS velocity may be indicative of general rotating machine/motor health (e.g., unbalance, misalignment, looseness). High-frequency (high-pass) acceleration may be indicative of early bearing wear.

Self-Learning Baseline and Thresholds

In some embodiments, the VSS may employ machine-learning algorithms to create an initial baseline reading and warning/alarm thresholds for each mechanical drive unit, individually. In such embodiments, this machine-learning may advantageously free users from generating baselines or alarms.

In an illustrative example, each target motor may have its own vibrational characteristics and therefore unique baseline measurements may be acquired. In some examples, the machine-learning algorithms may generate that baseline for the target motor vibration characteristics (RMS velocity and RMS high-frequency acceleration for X and Z axis). In some examples, the VSS may use the baseline to generate warnings and alarms based on statistical analysis, for example, using the standard deviation from the mean, for example, two standard deviations (2 sigma) outside of the mean for warnings, and three standard deviations (3 sigma) outside of the mean for alarms.

The VSS may create a filtered baseline during normal running operation and may also calculate the variance of the dataset collected during this phase, so that the system may determine its own alarming threshold(s). From the baseline and the variance, the system may calculate thresholds as a multiple of the standard deviation of the "training" dataset. Alternatively, the system may calculate a threshold as a multiple of, or a percentage of, the actual baseline itself. During run-time, the system may compare the measured data to these stored thresholds to generate alarms.

In some embodiments, "baseline+deviations" alarming thresholds may be employed. Accordingly, a running motor may be monitored for a period of time to collect a baseline data set. To calculate baseline and deviations, the motor on-off state may be employed to gate data collection. Further, statistics may be calculated from this data set. Once motor-running data is collected from a substantial time period (e.g., 24 hours) of actual running time, parameters may be calculated.

The baseline for a particular parameter may be the calculated statistical mean average of the collected data set. Further, variance of the collected data set may be calculated. Accordingly, the standard deviation of the collected data set may be determined for the particular parameter. Further, alarm thresholds may be generated from the statistics. In an illustrative example, a default "warning" level may be baseline plus 2 times the standard deviation. Further, for example, a default "alarming" level may be baseline plus 3 times the standard deviation. During run-time, the measured data set may be filtered and compared to these threshold levels to generate actionable alarms.

In some embodiments, baseline and alarm levels may be overridden by a user. In such examples, the user may manually enter custom threshold levels via a user interface. In some examples, the threshold may refer to a range (an upper and lower threshold pair) such that the target motor vibrational data must exist "between" the thresholds to be considered normal. Further, vibrational data outside the limits, either above the upper limit or below the lower limit, may be considered an alarm condition. In some examples of threshold range conditions, the upper threshold may be positive and the lower limit may be negative, such that "no vibration" or "zero vibration" is within range, and considered a non-alarm condition. In some examples, both the high and low limits may be positive. In some examples, both the high and low limits may be negative.

Learn Mode

In some embodiments, the VSS may employ various methods for learning a vibrational baseline, to establish the threshold to determine motor on-off. While operating a machine in steady-state, the VSS may be implemented by:
  a. Providing an accelerometer coupled to a body of a motor within a machine;
  b. Periodically sampling, from the accelerometer, an accelerometer output signal for a predetermined sampling interval;
  c. During each predetermined sampling interval, applying a predetermined frequency band filter (e.g., 1-4 kHz);
  d. During each predetermined sampling interval, calculating the RMS value of the resulting frequency-filtered signal;
  e. Defining an average motor-on value from the distribution of the resulting RMS values, the average motor-on value defined by the statistical mean;
  f. Defining a motor-on-off threshold by calculating a predetermined percentage (e.g., 50%) of the motor-on value.

In some embodiments, the VSS may employ a predetermined level as the motor on-off threshold (e.g., 20 mG). The predetermined level may be determined empirically by employment of a predetermined scale value (e.g., 2×) of the normal expected RMS noise-floor (e.g., 10 mG) of an accelerometer.

In some embodiments, the VSS may employ various methods for learning a vibrational baseline, to establish the threshold to that may determine an alarm or a warning. The VSS may be implemented by:
  a. Providing an accelerometer coupled to a body of a motor within a machine;
  b. Operating the motor in steady-state;
  c. Periodically sampling, from the accelerometer, an accelerometer output signal for a predetermined sampling interval;
  d. During each predetermined sampling interval, applying a predetermined High-Pass frequency band filter (e.g., 1-4 kHz);
  e. During each predetermined sampling interval, calculating the RMS value of the resulting frequency-filtered signal;
  f. Defining an average motor-on value from the distribution of the resulting RMS values, the average motor-on value defined by the statistical mean;
  g. Defining a motor-on-off threshold by calculating a predetermined percentage (e.g., 50%) of the average motor-on value. Values above the threshold being defined as MotorRunning=true. Values below the threshold being defined as MotorRunning=false.
  h. Operating the motor in normal running state;
  i. Periodically sampling, from the accelerometer, a second accelerometer output signal for a predetermined sampling interval;
  j. During each predetermined sampling interval, applying one or more predetermined frequency band filters (e.g., 0.01-1 kHz, motor fundamental, 2× motor fundamental, 1-4 kHz);
  k. During each predetermined sampling interval, calculating an RMS value for each of the resulting frequency-filtered signals;
  l. Calculating a long-term running average (baseline) for each of the resulting (e.g., RMS, scalar, or peak) values, "gating ON" the running average when MotorRunning is true and "gating OFF" the running average when MotorRunning is false;
  m. For each of the resulting long-term averages, determining an alarm threshold by calculating a predetermined percentage above each of the resulting long-term averages (baselines). Alternately, determining an alarm threshold by calculating baseline plus a predetermined number of standard deviations.

Acute and Chronic Alarms

In some and embodiments, by employment of the on-off flag to gate data collection, accurate moving average filters may be generated thereby triggering true alarm events. Moving averages in these embodiments may be accurate due to removal of data when the on-off flag is "off" (motor is off).

In some exemplary approaches, a moving average may be applied to the data set and may be compared to various alarm thresholds. In some examples, the approach to generate chronic alarms may be different than the approach to generate acute alarms.

In various exemplary approaches, a filter applying a "percentage exceeding alarm per time" variation may be employed. In some examples, one variation may be to require "M" samples exceeding threshold every "N" samples of motor running condition. For example, the filter may require 80 of 100 samples. In an illustrative example, if the values are above a predetermined threshold for 80% of the time (or samples) in a 10-minute period, then an acute alarm may be triggered. If the key values are above a predetermined threshold for 80% of the time (or samples) in a 16-hour period, then a chronic alarm may be triggered. Accordingly, using predetermined time-periods may allow differentiation between one or more acute alarm conditions and/or one or more chronic alarm conditions. For example, a "step increase in load or jam" may be distinguished from a chronic machine/motor failure. Also, for example, worn bearings may be distinguished from a loose or unbalanced condition. In such examples, the "percentage exceeding alarm per time" may be employed, particularly in situations with frequent on/off cycles, due to starting and stopping periods where the mechanical drive unit may not be at peak power or peak load. Accordingly, even though the steady-state values may be above an on/off threshold, the transition values, while still above the non-running state, may not be representative of the running condition. Two or more predetermined acute conditions, which may present simultaneously or in a prescribed sequence, may, in some implementations, also trigger a predetermined chronic alarm condition.

In some embodiments, a "check engine light" alarm and warning may be generated for both acute and chronic conditions for each motor. Acute thresholds may indicate a short-term condition such as a jammed motor or a motor stall. These conditions may cross the threshold rapidly. In some examples, chronic thresholds may use a multi-hour moving average of the vibration signals to indicate a long-term condition such as a wearing or failing bearing or failing motor.

Motor Run-Time

In some embodiments, the VSS may recognize and differentiate running-state versus idle-state to track cumulative run-time for each motor.

Temperature Alarms

In some examples, the vibration sensor for a VSS may include a temperature monitor. The temperature and monitor may alarm when a predetermined threshold is exceeded.

Remote Master Light

In some examples, the VSS output may be employed as an input to gate lighting on various tower lights. Accordingly, a master tower light may be employed to indicate an "OR-ed" state of one or more vibration alarms.

SMS Text/Email Alerts

In some embodiments, the VSS may generate SMS texts and/or email alerts based on individual warnings and/or alarms.

Cloud Monitoring

Some embodiments may push data to a cloud Web server or to a programmable logic controller (PLC) via a local area network (LAN) or cellular connection for remote viewing, alerting, and logging.

Exemplary Installation

In an illustrative implementation, a user mounts sensors and nodes to machines and/or motors of interest and activates a VSS vibration solution in a controller. Next, the user actuates the machine-learning sequence. In some examples, the learning sequence may be about 24 hours of motor-on operation. At the end of the machine-learning, the baseline and standard deviation information may be stored in system memory. Further, alarming thresholds may be calculated for the variables of interest.

Implementation of Alarms

The system may generate both acute and chronic alarm thresholds. The acute and chronic alarm thresholds may each include both warning and severe (high) levels for two sensor axes, for both RMS velocity, and RMS high-frequency acceleration.

After the machine-learning sequence, the system may enter the run-time mode during which time the data set from the sensors is compared against multiple alarm thresholds described above. Various alarms may be triggered based on the data set, or a processed data set, exceeding various alarm thresholds.

In some implementations, alarms may be indicated in data registers. The registers may be pushed to the cloud, stored on a nonvolatile memory device, or sent to a user's system controller for further evaluation or processing.

In various implementations, alarms may be mapped to one or more physical outputs on the controller. Alarms may also be routed through a remote radio to trigger audible or visual indicators.

In various implementations, two or more alarms may be "OR-ed" together, such that a single composite alarm may be implemented. In such implementations, a user may employ the controller GUI to determine which specific alarm(s) and/or machine variable(s) triggered the composite alarm.

In some embodiments, the "VSS generated Motor-ON logic signal" as described in this document, may be used to calculate a "running hours" tabulation. In some implementations, the Motor-ON logic signal may be used to count "motor on/off cycles." Users may find benefit in the "running hours" tabulation and/or the "motor on/off cycles" count, in calculating machine productivity and/or in calculating excessive cycling for determining running smoothness.

Other Vibrational Sensing Methods

In some implementations, the VSS may employ other methods of sensing vibration. For example, a laser may be employed as a position sensor. Various derivatives may be calculated from the transient positional data (e.g., to produce velocity, acceleration, or jerk). In some examples, piezo film may sense relative movement. Also, various MEMS sensors may be employed to sense position, velocity and/or acceleration.

Other Sensing Modalities

In some embodiments, sensors within the VSS may include a temperature sensor. The temperature sensor may be monitored and compared to a fixed temperature alarm threshold. In some examples, the temperature alarm threshold may be user adjustable. Temperatures exceeding the threshold may generate high-temperature alarms. Users may find benefit in the temperature alarms in determining, for example, coincident temperature rises with motor maintenance or with motor state changes.

Mounting of the Sensor

In some embodiments, manufacturers' prescribed mounting of the VSS sensor may provide for substantially accurate readings. A user may install the VSS sensor rigidly to a target motor, and close to the bearing of the target motor. The VSS vibrational sensors may have one or more axes of acceleration sensing. In some embodiments, a z-axis may be normal to the plane of the sensor. In some examples, an x-axis may be horizontal to the sensor. In further examples, a y-axis may be vertical to the sensor. In an illustrative example, a user may install the sensor such that the x-axis is parallel with a target motor shaft. Accordingly, a user may install the sensor such that the z-axis is radial to the target motor shaft. In some examples, sensing may take place on the x-axis and z-axis. In some examples, sensing may take place on the y-axis.

Various exemplary methods may be employed to couple the VSS sensor to a target motor. For example, thermally conductive adhesive tape may be applied between the VSS sensor and the target motor. Installers may find benefit with this method due to its ease-of-use. In various examples, a flat magnet sensor bracket may be employed, in such examples, the bracket may provide a strong solid and adjustable mount to the target motor. In some examples, a curved surface magnet coupled to a sensor bracket may be employed to couple the VSS sensor to the target motor. In these implementations, the curved surface magnet may provide a strong mount to small curved motor surfaces. Installers may find benefit with the curved surface magnet due to its strong coupling force and ease-of-installation.

VARIOUS EMBODIMENTS

In some examples, various modification may be made to the described VSS systems. Accordingly, advantageous results may be achieved if the VSS components of the disclosed system were combined in a different manner. For example, various embodiments may combine the sensor and the transmitter. In some examples, the wireless aspects may be eliminated, and the sensor may be directly connected to the controller receiver. In some examples, a VSS may be a single sensor system, including only a sensor, which may incorporate all the functionality of the senor and the controller.

In some examples, the term "motor" may refer to various mechanical drive units. For example, in some implementations, the VSS may be employed to monitor rotating motors, vibrational motors, and articulating motors such as windshield wipers. In some examples, the VSS may monitor electric motors. In some examples, the VSS may monitor internal combustion engines. In various examples, the VSS may be employed to monitor the bearings on a computer hard drive. Some embodiments may monitor one or more vibration characteristics. For example, monitoring may be employed on the X and Z axis for one or more motors.

In some examples, the VSS may provide wireless or wired access to a personal computer (e.g., laptop, tablet, cell phone) such that control normally facilitated through use of the controller receiver may instead occur on the personal computer. Users may find benefit in leveraging the display screen and/or other user interface elements (e.g., mouse) on the personal computer, to provide interaction with the VSS. In various examples, the personal computer may augment the functionality of the VSS, such that the user may be provided a larger and more colorful GUI and more user-friendly input devices than on the controller. In such embodiments, the controller may continue to provide its specified functions, but may in addition provide more user interaction. In some embodiments, the personal computer may act as a setup and/or a programming tool to the controller. In some embodiments, the personal computer may replace the controller.

In some exemplary descriptions, the term "demodulation" may be defined as running analytics on sampled data to determine various aspects, for example, to determine when the motor is running. Further, comparing run-time vibrational data from the motor, to various thresholds, may be indicative of trouble, and may trigger various alarms.

In some examples, known machine/motor wear conditions (e.g., unbalance, misalignment, looseness, bearing damage) may be identified by measuring acceleration time waveforms and from these waveforms calculating and monitoring the overall RMS velocity at mid-range frequencies (e.g., 10-1000 Hz) and the overall RMS acceleration at higher frequencies (e.g., >1000 Hz).

In some embodiments, a site survey feature may be employed within the VSS. The site survey may allow the user to select each data transmitter (e.g., transmitter node 115) within the system to verify the wireless connection between the data transmitter and the controller receiver.

In an illustrative example, continuous monitoring of vibration data may minimize downtime, allow tracking of uptime, and may send alerts to appropriate personnel of the need of maintenance. Such advanced warning of needed maintenance may avoid costly machine failures.

In some embodiments, the VSS may create a "check engine light" for each motor using in-depth analysis to indicate unusual characteristics without user interaction. This approach may save time and money by limiting full-spectrum vibration analyses to only when a motor is indicating a potential failure mode. This targeted approach may avoid unexpected downtime of motors by recognizing a potential failure early on, giving time to schedule preventative maintenance and extend machine life.

In various examples, the user may not need to adjust any parameters within the VSS. The parameters may be "learned" by the VSS, or may be preprogrammed absolute default levels. Accordingly, the user may only be expected to initiate a "learning" sequence during which the machine runs under normal conditions and the system collects data.

Various embodiments may achieve one or more advantages. For example, factory managers may be informed when a motor is running or not-running. In some examples, process managers, or other personal may monitor a large number of machines/motors at once for the running or not-running indication. In some examples, the VSS may autonomously determine if a motor is on or idle based on vibrations in a machine that contains multiple sources of vibration. In some examples, the VSS may evaluate baseline data and determine when the motor is running, which may advantageously create accurate baselines and standard deviations from which the alarm thresholds may be generated.

In some embodiments, the VSS may reliably implement disturbance rejection of cross-coupled machines. For example, vibrations from nearby motors within the same mechanical housing or frame may be substantially filtered out (rejected) from the vibrations of the target motor.

In some embodiments, the VSS may reliably predict and generate alarms for acute events such as machine jams and stalls. In some examples, the VSS may implement a straight-forward machine-learning approach that may require a minimum of user interaction and parameter selection to setup.

In various examples, the comparison functions may be digital logic circuits, for example, implemented with logic gates. In some examples, the comparison functions may be analog circuitry, for example, implemented with comparators and/or transistors. Further, the comparison functions may be implemented in circuitry with a combination of digital and analog components. In some embodiments, the comparator circuits may employ hysteresis. In yet other examples, the logic functions may be implemented in a computer processor.

Computer System

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A vibration sensing method comprising:
   in a learn mode: generate at least one threshold as a function of a first set of vibration data; and,
   in a run mode:
   receive vibration data of a monitored mechanical unit;
   compute at least one parameter based on the received vibration data;
   compare the at least one parameter to the generated at least one threshold;
   determine an on-off operational state of the monitored mechanical unit based on the comparison of the at least one parameter to the at least one threshold;
   gate data processing of the vibration data based on the determined on-off operational state of the mechanical unit; and,
   output at least one indication signal when the received vibration data exceeds the at least one threshold.

2. The vibration sensing method of claim 1, wherein determine an on-off operational state of the monitored mechanical unit comprises:
   if the at least one parameter exceeds the at least one threshold, then determining than the mechanical unit is in an on state, and,
   if the at least one parameter does not exceed the at least one threshold, then determining that the mechanical unit is in an off state.

3. The vibration sensing method of claim 1, wherein the at least one parameter comprises at least one root-mean-square (RMS) parameter of the received vibration data and the at least one threshold comprises at least one RMS threshold.

4. The vibration sensing method of claim 1, wherein the at least one parameter comprises at least one peak parameter of the received vibration data and the at least one threshold comprises at least one peak threshold.

5. The vibration sensing method of claim 1, wherein the at least one parameter comprises an acceleration parameter and the at least one threshold comprises an acceleration threshold.

6. The vibration sensing method of claim 1, wherein the at least one parameter comprises a velocity parameter and the at least one threshold comprises a velocity threshold.

7. The vibration sensing method of claim 1, wherein gate data processing of the vibration data based on the determined on-off operational state of the mechanical unit comprises:
   enable data processing of the vibration data when the mechanical unit is determined to be in an on state, and,
   disable data processing of the vibration data when the mechanical unit is determined to be in an off state.

8. The vibration sensing method of claim 1, wherein gate data processing of the vibration data based on the determined on-off operational state of the mechanical unit comprises:
enable data collection of the vibration data when the mechanical unit is determined to be in an on state, and,
disable data collection of the vibration data when the mechanical unit is determined to be in an off state.

9. The vibration sensing method of claim 1, wherein compute at least one parameter comprises apply at least one vibration data filter to the received vibration data to generate, as an output of the at least one vibration data filter, at least one overall trending parameter such that the at least one overall trending parameter is a filtered function of the received vibration data.

10. The vibration sensing method of claim 9, wherein the at least one vibration data filter comprises an acceleration data filter.

11. The vibration sensing method of claim 10, wherein the acceleration data filter comprises a high-pass acceleration filter.

12. The vibration sensing method of claim 10, wherein the acceleration data filter comprises a high-pass RMS acceleration filter.

13. The vibration sensing method of claim 10, wherein the acceleration data filter comprises a high-pass peak acceleration filter.

14. The vibration sensing method of claim 9, wherein the at least one vibration data filter comprises a velocity data filter.

15. The vibration sensing method of claim 14, wherein the velocity data filter comprises an RMS velocity filter.

16. The vibration sensing method of claim 14, wherein the velocity data filter comprises a peak velocity filter.

17. The vibration sensing method of claim 14, wherein compare the at least one parameter to the at least one threshold comprises:
determine a comparison result by comparing the at least one overall trending parameter to the at least one threshold; and,
apply a first filter to the comparison result to generate, as an output of the first filter, the at least one indication signal.

18. The vibration sensing method of claim 17, wherein the at least one indication signal is generated when N input events occur within a period M.

19. The vibration sensing method of claim 17, wherein compare, by the first threshold comparator, further comprises select an input of the first threshold comparator by time-division multiplexing of the at least one overall trending parameter.

20. The vibration sensing method of claim 9, wherein compare the at least one parameter to the at least one threshold comprises:
apply a first filter to the at least one overall trending parameter; and,
compare, by a first threshold comparator, an output of the first filter to the at least one threshold and output the at least one indication signal.

21. The vibration sensing method of claim 20, wherein the first filter comprises a N-sample moving average filter configured such that the output of the first filter comprises a moving average of the at least one overall trending parameter over N samples.

22. The vibration sensing method of claim 20, wherein compare, by a first threshold comparator, further comprises select an input of the first filter by time-division multiplexing of the at least one overall trending parameter.

23. The vibration sensing method of claim 1, wherein:
the at least one threshold comprises at least one acute alarm threshold and at least one chronic alarm threshold,
the at least one indication signal comprises at least one acute alarm signal and at least one chronic alarm signal, and,
wherein, the vibration sensing method further comprise, in the learn mode:
generate the at least one acute alarm threshold, and,
generate the at least one chronic alarm threshold, and,
in the run mode:
compare the received vibration data to the generated at least one acute alarm threshold,
output the at least one acute alarm signal when the received vibration data exceeds the generated at least one acute alarm threshold,
compare the received vibration data to the generated at least one chronic alarm threshold, and,
output the at least one chronic alarm signal when the received vibration data exceeds the generated at least one chronic alarm threshold.

24. The vibration sensing method of claim 1, further comprising:
filter disturbance of other mechanical units cross-coupled with the mechanical unit based on the at least one parameter.

25. The vibration sensing method of claim 24, wherein:
the at least one threshold comprises a predetermined function of a level of cross-coupling between at least some of the other mechanical units cross-coupled with the mechanical unit.

26. The vibration sensing method of claim 24, wherein the at least one threshold comprises:
a velocity threshold of at least 0.05 in/sec; and,
an acceleration threshold of at least 20 mG.

27. The vibration sensing method of claim 1, wherein the received vibration data is received via at least one wireless transmitter node.

28. The vibration sensing method of claim 1, wherein the first set of vibration data is received at a different time than the received set of vibration data.

* * * * *